United States Patent [19]

Bahn

[11] Patent Number: 5,274,287
[45] Date of Patent: Dec. 28, 1993

[54] HIGH-SPEED MOTOR
[75] Inventor: Itsuki Bahn, Nerima, Japan
[73] Assignee: Kabushikigaisha Sekogiken, Tokyo, Japan
[21] Appl. No.: 946,445
[22] PCT Filed: Mar. 6, 1992
[86] PCT No.: PCT/JP92/00271
   § 371 Date: Nov. 5, 1992
   § 102(e) Date: Nov. 5, 1992
[87] PCT Pub. No.: WO92/16046
   PCT Pub. Date: Sep. 17, 1992

[30] Foreign Application Priority Data
   Mar. 7, 1991 [JP] Japan .................. 3-123302
   Mar. 18, 1991 [JP] Japan .................. 3-128907
[51] Int. Cl.⁵ .................. H02K 11/00; H02P 1/46
[52] U.S. Cl. .................. 310/68 B; 310/166;
            310/269; 318/254; 318/701
[58] Field of Search .................. 310/68 R, 68 B, 71,
       310/72, 106, 156, 166, 254, 256, 261, 262, 269;
                    318/138, 439, 685, 696, 254, 701

[56] References Cited
U.S. PATENT DOCUMENTS

| | | | |
|---|---|---|---|
| 4,670,696 | 6/1987 | Byrne et al. | 318/701 |
| 5,012,172 | 4/1991 | Sember | 318/701 |
| 5,043,643 | 8/1991 | Hedlund et al. | 318/254 |
| 5,097,191 | 3/1992 | Bahn | 318/701 |
| 5,111,091 | 5/1992 | Bahn | 310/68 B |
| 5,168,190 | 12/1992 | Bahn | 310/166 |
| 5,214,365 | 5/1993 | Bahn | 310/254 |

FOREIGN PATENT DOCUMENTS

| | | | |
|---|---|---|---|
| 54-73223 | 6/1979 | Japan | 310/68 B |
| 2-307391 | 12/1990 | Japan | 310/68 B |

Primary Examiner—Steven L. Stephan
Assistant Examiner—Matthew Nguyen
Attorney, Agent, or Firm—Staas & Halsey

[57] ABSTRACT

The object of the present invention is to obtain a motor capable of producing a large torque and operating with good efficiency in a high-speed region. A reluctance type motor according to the present invention, when one armature coil (32a) is deactivated through one switching element connected to a negative voltage terminal, prevents the magnetic energy stored in the magnetic core from returning to the electric power source by means of a back-flow preventing diode (21a). The magnetic energy is used to charge a small-capacitance capacitor (47a) to hold it to a high voltage. Thus, a trailing-off of current becomes steep. After a predetermined time has elapsed, a next armature coil (32e) is activated. As an applied voltage is a high voltage charged in the capacitor, the exciting current builds up sharply. Since the building-up and the trailing-off of the exciting current of the armature coil can be made sharp, the rotational speed can also be increased up to several 10 thousand rpm. Furthermore, the inductance coil is activated when the armature coil is activated. When both the armature coil and the inductance coil are deactivated, magnetic energies stored in both coils are discharged into the capacitor to charge it. Then, the energy thus charged in the capacitor is used to compensate the energy loss caused by copper loss and iron loss.

10 Claims, 24 Drawing Sheets

HIGH-SPEED MOTOR

TECHNICAL FIELD

The present invention relates to a high-speed motor, which is not only capable of operating at higher speeds and less attenuation of output torque compared with conventional brushless motors and reluctance type motors but also capable of being used as a high-speed stepping motor capable of producing relatively high output and as a DC motor having the same advantage.

BACKGROUND ART

A reluctance type motor is advantageous not only in that it produces a large output torque but also in that it does not require a magnet rotor. The reluctance type motor, however, many disadvantages too. Thus, there are few cases that the reluctance type motor has been utilized in a practical aspect.

On the other hand, a stepping motor is capable of producing a large output, but is used only for special purposes due to the reason that its stepping speed is too slow. For the DC motor, however, there is a case that a high-speed DC motor has been developed, but it cannot be widely used due to the reason that its efficiency is apt to deteriorate.

First problem for reluctance type motor includes that the switching elements are connected to both ends of respective armature coils for activating these armature coils, and this requires a number of expensive power elements, entailing the increase of the cost, and that the switching elements provided on the sides of a positive terminal of an electric power source are required to have electric signals inputted from another electric power source for controlling currents supplied to the armature coils, another factor of cost increase.

As a second problem, a reluctance type motor has a rotor provided with many salient poles, entailing the increase of the inductance. This increase of inductance causes the increase of the magnetic energy stored into or discharged from magnetic poles and salient poles, as well as the increase in the number of times of such storing and discharging cycles during one complete revolution of the rotor.

Accordingly, a reluctance type motor is advantageous in that it is capable of producing a high output torque but disadvantageous in that it is unable to rotate at high speeds. A DC motor also have the same problem if required to rotate at a higher speed.

As a third problem, since the inductance of the armature coil is very large in the case of a motor having a large output, not only a current builds up slowly at an initial stage of the current supply period but also it trails off at a terminating stage of the current supply period. The former becomes a problem in that it decrease an output torque, and the latter also becomes a problem in that it causes a counter torque to generate.

If a high-voltage is applied from an electric power source in order to make rapid the building-up of the armature current in the initial stage of the current supply section, the building-up of the armature current becomes very rapid after a magnetic saturation point. For this reason, the motor causes vibrations and electric noises, and, since the torque is small during the above-described building-up section of the armature current, there occurs a problem such that merely disadvantages are intensified.

Thus, there was a problem such that a high-speed rotation (i.e. several 10 thousand rpm) cannot be realized due to the generation of the above-described torque reduction and counter torque. Even if the rotational speed is reduced down to a generally utilized speed level (i.e. several thousands rpm), the torque reduction and the counter torque are still generated to deteriorate the efficiency of the motor. If a means for increasing an electric power source voltage is adopted in order to increase the output torque, the voltage needs to be increased to more than 1000 volts to lose a practical merit of such a system.

A brushless DC motor will be encounter with the same problems if required to be driven within a higher speed region.

DISCLOSURE OF INVENTION

The object of the present invention is to provide a high-speed motor having good efficiency and high torque.

The present invention provides a high-speed three-phase half-wave current supply mode reluctance type motor including a fixed armature and a magnetic rotor, comprising:

a plurality of salient poles with the same widths, disposed on an outer surface of the magnetic rotor and mutually spaced at regular intervals of the same angle;

6n pieces (n: a positive interger) of magnetic pole protruding from an inner peripheral surface of the fixed armature to face said salient poles through slight gaps, said magnetic poles, disposed at regular intervals and having the same circumferential width of 120 degrees or 180 degrees by electrical angle, to be wound by an associated armature coil, each pair of which are symmetrically disposed and have the same phase;

No.1-, No.2- and No.3-phase armature coils associated with said magnetic poles;

a position detecting device including a plurality of position detecting elements for detecting rotational positions of said salient poles and generating rectangular-waveform No.1-phase position detecting signals having the same width of 120 degrees by electrical angle and a phase difference of 360 degrees by electrical angle therebetween, and rectangular-waveform No.2- and No.3-phase position detecting signals having the same width and phase difference as the No.1-phase position detecting signals but being successively delayed one another from the No.1-phase position detecting signals by an electric angle of 120 degrees;

a switching element connected to both ends of each armature coil;

first diodes inversely connected to a negative voltage terminal of a DC electric power source in parallel with serial joint units each consisting of said switching element and its corresponding armature coil and second diodes each having one end inversely connected to a negative voltage terminal of said armature coil;

first, second and third current supply control circuits for supplying currents to said No.1-, No.2- and No.3-phase armature coils through third, fourth and fifth back-flow preventing diodes respectively connected to the DC electric power source in a forward direction by turning on said switching elements connected to both ends of the armature coils in response to said No.1-, No.2- and No.3-phase position detecting signal;

first, second and third capacitors having small capacitances for storing magnetic energies discharged from said No.1-, No.2- and No.3-phase armature coils through said first and second diodes each having one end being inversely connected to the negative voltage terminal and included in the first, second and third current supply control circuits respectively, when these armature coils are deactivated;

an electric circuit for supplying electrostatic energy charged in the first capacitor to the No.3-phase armature coil when the No.3-phase armature coil is activated, and supplying electrostatic energies charged in the third and second capacitors to the No.2-phase and No.1-phase armature coils when the No.2-phase and No.1-phase armature coils are activated, respectively; and a means for fixing said position detecting elements on the side of the fixed armature so that said armature coils wound round said magnetic poles can be activated at a predetermined angle within an electric angle of approximately 30 degrees beginning from the point at which said salient poles start entering said magnetic poles.

Furthermore, in addition to the above-described measure, the high-speed motor comprises an inductance coil which is supplied with current corresponding to first halves of said No.1-, No.2- and No.3-phase position detecting signals, and an electric circuit for converting magnetic energy stored in said inductance coil into electrostatic energy of said first, second and third capacitors when said inductance coil is deactivated.

Moreover, the present invention provides a high-speed three-phase full-wave current supply mode reluctance type motor including a fixed armature and a magnetic rotor, characterized by comprising:

a plurality of salient poles having the same widths, disposed on an outer surface of the magnetic rotor at regular intervals and the equal angles;

12 n pieces (n: a positive integer) of magnetic pole protruding from an inner peripheral surface of the fixed armature to face said salient poles through slight gaps, said magnetic poles, disposed at regular intervals and having the same circumferential width of 120 degrees or 180 degrees by electrical angle, to be wound with an associated armature coil, each pair of which are symmetrically disposed and have the same phase;

armature coils wound round said magnetic poles;

a position detecting device including a plurality of position detecting elements for detecting rotational positions of said salient poles, as well as for generating rectangular-waveform No.1-phase position detecting signals having the equal width by an electric angle of 120 degrees and a phase difference by an electric angle of 360 degrees therebetween, and rectangular-waveform No.2- and No.3-phase position detecting signals having the same width and phase difference as the No.1-phase position detecting signals but being successively delayed from one another from the No.1-phase position detecting signals by an electric angle of 120 degrees, further a rectangular-waveform No.1-phase position detecting signals having the same width and phase difference as the No.1-phase position detecting signals but delayed from said No.1-phase position detecting signals by an electric angle of 180 degrees, and rectangular-waveform No.2- and No.3-phase position detecting signals having the same width and phase difference as the No.1-phase position detecting signals but being successively delayed from one another from the No.1-phase position detecting signals by an electric angle of 120 degrees;

a pair of armature coils to be activated with No.1-phase half-wave current, which are referred to as No.1 and No.1 armature coils, and pairs of armature coils to be activated with No.2-phase and No.3-phase half-wave currents, which are respectively referred to as No.2 and No.2 armature coils, and No.3 and No.3 armature coils;

first diodes inversely connected at a negative voltage terminal of a DC electric power source in parallel with serial joint units each consisting of said switching element and its corresponding armature coil, and second diodes each having one end inversely connected to a negative voltage terminal of said armature coil;

a first electric circuit for turning on the switching elements connected to both ends of said No.1-, No.2- and No.3-armature coils wound round said magnetic poles of the fixed armature in response to said No.1-, No.2- and No.3-phase position detecting signals, as well as for turning on the switching elements connected to both ends of said No.1-, No.2- and No.3-armature coils wound round other magnetic poles of the fixed armature in response to said No.1-, No.2- and No.3-phase position detecting signals, respectively;

first and second current supply control circuits for supplying currents, by turning on said switching elements, to said No.1-, No.2-, No.3-armature coils and No.1-, No.2-, No.3-armature coils through third, fourth, - - -, and eighth back-flow preventing diodes respectively connected to the DC electric power source in a forward direction;

No.1-, No.2-, No.3-, No.1-, No.2- and No. 3-capacitors with small capacitances for storing magnetic energies discharged from said No.1-, No.2-, No.3-phase armature coils and said No.1-, No.2-, No.3-phase armature coils through said first and second diodes each having one end being inversely connected to the negative voltage terminal and included in the first and second current supply control circuits when said No.1-, No.2- and No.3-phase armature coils and said No.1-, No.2- and No.3-phase armature coils are deactivated, respectively;

a second electric circuit for supplying electrostatic energies charged in the No.1- and No.1-capacitors to the No.3- and No.3-phase armature coils when the No.3- and No.3-phase armature coils are activated, and further for supplying electrostatic energies charged in the No.3- and No.3-capacitors to the No.2- and No.2-phase armature coils when the No.2- and No.2-phase armature coils are activated, for further for supplying electrostatic energies charged in the No.2- and No.2-capacitors to the No.1- and No.1-phase armature coils when the No.1- and No.1-phase armature coils are activated; and a means for fixing said position detecting elements on the fixed armature so that said armature coils wound round said magnetic poles can be activated at a predetermined angle within approximately 30 degrees by electrical angle after said salient poles begin to enter said magnetic poles.

Furthermore, in addition to the above-described means, the high-speed motor further comprises a first inductance coil which is supplied with current corresponding to first halves of said No.1-, No.2- and No.3-phase position detecting signals, a second inductance coil which is supplied with current corresponding to first halves of said No.1-, No.2- and No.3-phase position detecting signals, and an electric circuit for converting magnetic energy stored in said first inductance coil into electrostatic energies of said No.1-, No.2- and No.3-capacitors when said first inductance coil is deactivated and further converting magnetic energy stored in said second inductance coil into electrostatic energies of said No.1-, No.2-, and No.3-capacitors when said second inductance coil is deactivated.

Still further, the present invention provides a high-speed three-phase full-wave current supply mode DC motor including a fixed armature and a magnet rotor, characterized by comprising:

No.1-, No.2- and No.3-phase armature coils being associated with magnetic poles of the armature;

said armature coils including an armature coil being referred to as a No.1-phase armature coil of No.1-phase normal-direction current supply mode, an armature coil being referred to as a No.1-phase armature coil of No.1-phase reverse-direction current supply mode, armature coils being referred to as No.2- and No.3-phase armature coils of No.2-phase and No.3-phase normal-direction current supply modes, and armature coils referred to as No.2- and No.3-phase armature coils of No.2-phase and No.3-phase reverse-direction current supply modes;

a position detecting device including a plurality of position detecting elements for detecting rotational positions of N- and S-poles of said magnet rotor and generating rectangular-waveform No.1-phase position detecting signals having the same width by an electric angle of 120 degrees and a phase difference by an electric angle of 360 degrees therebetween, and rectangular-waveform No.2- and No.3-phase position detecting signals having the same width and phase difference as the No.1-phase position detecting signals but being successively delayed one another from the No.1-phase position detecting signals by an electric angle of 120 degrees and further rectangular-waveform No.1-phase position detecting signals having the same width and phase difference as the No.1-phase position detecting signals but delayed from said No.1-phase position detecting signals by an electric angle of 180 degrees, and rectangular-waveform No.2- and No.3-phase position detecting signals having the same width and phase difference as the No.1-phase position detecting signals but successively delayed one another from the No.1-phase position detecting signals by an electric angle of 120 degrees;

a switching element connected to both ends of each armature coil;

first diodes inversely connected to a negative voltage terminal of a DC electric power source in parallel with serial joint units each consisting of said switching element and its corresponding armature coil and second diodes each having one end inversely connected to a negative voltage terminal of said armature coil;

a first electric circuit for turning on the switching elements connected to both ends of said No.1-, No.2- and No.3-armature coils in response to said No.1-, No.2- and No.3-phase position detecting signals, and further turning on the switching elements connected to both ends of said No.1-, No.2- and No.3-armature coils in response to said No.1-, No.2- and No.3-phase position detecting signals, respectively;

first and second current supply control circuits for supplying currents to said No.1-, No.2-, No.3-armature coils and No.1-, No.2-, No.3-armature coils through third, fourth, - - - and eighth back-flow preventing diodes respectively connected to the DC electric power source in a forward direction by turning on said switching elements;

No.1-, No.2-, No.3-, No.1-, and No.2-and No.3-capacitors with small capacitances for storing magnetic energies discharged from said No.1-, No.2-, No.3-phase armature coils and said No.1-, No.2-, No.3-phase armature coils through said first and second diodes each having one end inversely connected to the negative voltage terminal and included in the first and second current supply control circuits when said No.1-, No.2-, No.3-phase armature coils and said No.1-, No.2-, No.3-phase armature coils are deactivated respectively;

a second electric circuit for supplying electrostatic energies charged in the No.1- and No.1-capacitors to the No.3- and No.3-phase armature coils when the No.3- and No.3-phase armature coils are activated, for supplying electrostatic energies charged in the No.3- and No.3-capacitors to the No.2- and No.2-phase armature coils when the No.2- and No.2-phase armature coils are activated, and further for supplying electrostatic energies charged in the No.2- and No.2-capacitors to the No.1- and No.1-phase armature coils when the No.1- and No.1-phase armature coils are activated; and a means for fixing said position detecting elements on the fixed armature side so that an output torque generated by activations of respective armature coils becomes a maximum value.

Yet further, the present invention provides a high-speed plural-phase reluctance type motor including a fixed armature and a magnetic rotor, characterized by comprising:

a plurality of salient poles each having the same width and disposed on an outer surface of the magnetic rotor and mutually spaced at regular intervals of the same angle;

2 n pieces (n: a positive integer not less than 3) of magnetic pole protruding from an inner peripheral surface of the fixed armature to face said salient poles through slight gaps, said magnetic poles, disposed at regular intervals and having the same circumferential width of 120 degree or 180 degrees by electrical angle, to be wound with an associated armature coil, each pair of which are symmetrically disposed and have the same phase;

plural-phase armature coils associated with said magnetic poles;

a position detecting device for detecting rotational positions of said salient poles and generating plural-phase position detecting signals;

one switching element connected to each armature coil on the side of a negative terminal side of an electric power source;

a first diode connected, in a normal direction, to the armature coil on the side of positive terminal of the electric power source;

a DC electric power source for supplying electric power to a serial joint unit consisting of said first diode, said armature coil, and the switching element;

a current supply control circuit for activating plural-phase armature coils to generate an output torque by turning on said switching elements connected to respective armature coils in response to said plural-phase position detecting signals;

a first electric circuit for discharging magnetic energy stored in said armature coils through second diodes each being connected between the armature coil and the switching element and storing them in a small-capacitance capacitor when the switching element is turned off at a terminal end of the position detecting signal, so that armature current of the armature coil can be decreased steeply; and a second electric circuit for supplying electrostatic energy charged in the small-capacitance capacitor to the armature coil through a semiconductor element to be turned on in response to the position detecting signal when the armature coil is activated in response to the position detecting signal after a predetermined time has elapsed, so that the armature current builds up sharply.

Furthermore, in addition to the above-described means, the high-speed motor further comprises an inductance coil to be supplied with current by a width predetermined from beginning points of plural-phase position detecting signals, and a third electric circuit for converting magnetic energy stored in said inductance coil into electrostatic energy of said small-capacitance capacitor when said inductance coil is deactivated so that the electrostatic energy is held to a value added with electrostatic energy converted from the magnetic energy stored in the armature coils, thereby compensating copper loss of the armature coils and iron loss of the magnetic core respectively occurring when the magnetic energy is transferred between the armature coils, as well as sharpening a building-up of the armature current of the armature coil.

Moreover, a high-speed plural-phase DC motor including a fixed armature and a magnet rotor, comprising:

a plurality of N- and S-magnetic poles each having the same width and alternately disposed to be N- or S-pole on an outer surface of the magnet rotor;

3 n pieces (n: a positive integer not less than 3) of field magnetic pole disposed to face said N- and S-magnetic poles through slight gaps, said field magnetic poles, disposed at regular intervals and having the same circumferential width of 120 degrees-180 degrees by electrical angle, to be wound with an associated armature coil;

plural-phase armature coils of bifilar winding associated with said magnetic poles;

a position detecting device including a plurality of position detecting elements for detecting rotational positions of said N- and S-magnetic poles, and for generating rectangular-waveform No.1-phase position detecting signals having the same width by an electric angle of 120 degrees and a phase difference by an electric angle of 360 degrees therebetween, and rectangular-waveform No.2-and No.3-phase position detecting signals having the same width and phase difference as the No.1-phase position detecting signals but being successively delayed one another from the No.1-phase position detecting signals by an electric angle of 120 degrees;

one switching element connected to each armature coil on the side of a negative terminal of an electric power source;

a first diode connected, in a normal direction, to the armature coil on the side of positive terminal of the electric power source;

a DC electric power source for supplying electric power to a serial joint unit consisting of said first diode, said armature coil and the switching element;

a current supply control circuit for activating No.1-, No.2- and No.3-phase armature coils to generate an output torque by turning on said switching elements connected to respective armature coils in response to No.1-, No.2- and No.3-phase position detecting signals;

a first electric circuit for discharging magnetic energy stored in said armature coils through second diodes, each connected between the armature coil and the switching element, and storing them in a small-capacitance capacitor when the switching element is turned off at a terminal end of the position detecting signal so that armature current of the armature coil can be increased steeply; and a second electric circuit for supplying electrostatic energy charged in the small-capacitance capacitor to the armature coil through a semiconductor element to be turned on in response to the position detecting signal when the armature coil is activated in response to the position detecting signal after a predetermined time has elapsed so that the armature current can be built up sharply.

Still further, the present invention provides a high-speed plural-phase reluctance type stepping motor including a fixed armature and a magnetic rotor, characterized by comprising:

a plurality of salient poles, each having the same width and disposed on an outer surface of the magnetic rotor and being mutually spaced at regular intervals of the same pitch;

2 n pieces (n: a positive integer not less than 3) of magnetic pole protruding from an inner peripheral surface of the fixed armature to face said salient poles through slight gaps, said magnetic poles, disposed at regular intervals and with the same circumferential width of 120 degrees or 180 degrees by electrical angle, to be wound with an associated armature coil, each pair of which are symmetrically disposed and have the same phase;

plural-phase armature coils associated with said magnetic poles;

a pulse oscillator and a pulse distributer for generating plural-phase stepping electric signals consisting of electric signals, having an electric angle width of 180 degrees and being spaced one another by 180 degrees and electric signals offset from said electric signals by a predetermined phase difference;

one switching element connected to each armature coil on the side of a negative terminal of an electric power source;

a first diode connected, in a normal direction, to the armature coil on the side of negative terminal of the electric power source;

a DC electric power source for supplying electric power to a serial joint unit consisting of said first diode, said armature coil, and the switching element;

a current supply control circuit for activating plural-phase armature coils to generate a stepping output torque by turning on said switching elements connected to respective armature coils in response to said plural-phase stepping electric signals;

a first electric circuit for discharging magnetic energy stored in said armature coils through second diodes, each connected between the armature coil and the switching element, and storing them in a small-capacitance capacitor when the switching element is turned off at a terminal end of the position detecting signal so that armature current of the armature coil can be decreased steeply; and a second electric circuit for supplying electrostatic energy charged in the small-capacitance capacitor to the armature coil through a semiconductor element to be turned on in response to the stepping electric signal when the armature coil is activated in response to a next arriving stepping electric signal, so that the armature current can be built up sharply.

Furthermore, in addition to the above-described means, the high-speed motor further comprises an inductance coil which is supplied with current by widths predetermined from beginning points of plural-phase stepping electric signals, and a third electric circuit for converting magnetic energy stored in said inductance coil into electrostatic energy of said small-capacitance capacitor when said inductance coil is deactivated, so that the electrostatic energy is held to a value added with electrostatic energy converted from the magnetic energy stored in the armature coils, thereby compensating copper loss of the armature coils and iron loss of the magnetic core respectively occurring when the magnetic energy is transferred between the armature coils, as well as sharpening a building-up of the armature current of the armature coil.

In accordance with the present invention, armature coils are activated in response to stepping electric signals or position detecting signals. When they are deactivated at the terminal ends of the stepping electric signals or the position detecting signals, the magnetic energy stored in the armature coils is discharged to charge a small-capacitance capacitor to hold it to a high voltage. Accordingly, a time period of magnetic energy extinction becomes so short that the generation of counter torque can be prevented.

In response to a next arriving position detecting signal, a current supply is initiated after a predetermined time has elapsed. In this case, an applied voltage is equal to a summation of the charged voltage of said capacitor and the electric power source voltage. Therefore, a building-up of the armature current becomes sharp. Accordingly, the generation of torque reduction is prevented. As can be understood from the foregoing explanation, according to the present invention, a disadvantage of the reluctance type motor of not being able to operate in a high speed region can be removed. Thus, the second and the third problems can be solved.

Furthermore, in order to increase charging energy of the above-described capacitor, the capacitor is charged with the energy equal to summation of magnetic energy stored in the inductance coil and magnetic energy stored in the armature coils.

Thus, magnetic energy drop in the armature coil occurring due to iron loss and copper loss during a charging operation can be compensated. And further, as it can be converted into magnetic energy of a next activated armature coil, a building-up and a trailing-off of the armature current of the next activated armature coil can be made rapidly.

Consequently, a high-speed rotation of the motor can be realized. It is especially effective in the case where the electric power source voltage is low.

Moreover, the number of expensive circuit components can be reduced down to a half, since only one switching element is needed on the side of a negative terminal of the electric power source for controlling the activation of one armature coil. Still further, as the switching element is provided at the negative terminal side of the electric power source, its current supply control circuit can be simplified. Thus, the first problem can be solved.

As is explained in the foregoing explanation, with the present invention, it is possible to realize a motor generating small vibration and large output torque. A ripple torque can also be reduced by constituting a motor as a three-phase full-wave current supply mode type.

Further, when designed as a brushless three-phase DC operation having a magnet rotor, a high-speed motor can be obtained. In such a case, even if the number of magnetic poles is increased, the rotational speed of the motor will not drop. Therefore, a motor having a large torque can be obtained. Furthermore, it is possible to obtain a motor capable of rotating at a high speed with good efficiency.

Furthermore, as the activation of each armature coil can be controlled by only one power element provided on a negative terminal side of the electric power source, the cost of the current supply control circuit can be reduced.

Besides, it also becomes possible to obtain a motor capable of operating at a high speed (approximately 100 thousands rpm). As no torque reduction and no counter torque is generated even in a high-speed region, the present invention can provides a useful technique.

Furthermore, when designed as a stepping motor, the motor can be driven in response to stepping electric signals having high frequency. In this case too, no output torque reduction is generated, and, therefore, the disorder of the motor can be prevented.

Moreover, when one armature coil is deactivated, the magnetic energy stored in this armature coil is converted into the electrostatic energy of the capacitor. And, the stored electrostatic energy is converted into the magnetic energy of an armature coil to be next activated. Thus, by changing the capacitance of the capacitor, the building-up speed and the trailing-off speed of the armature current can be adjusted to a required speed. Thus, a motor capable of operating with good efficiency in a high-speed region can be obtained.

Still further, copper losses of the armature coils and iron losses of the magnetic cores occurring when the magnetic energy is transferred between the armature coils can be compensated by the magnetic energy stored in the inductance coil. Therefore, it is possible to largely speed the building-up and the trailing-off of the armature current. Thus, a motor having large output in a high-speed region can be obtained. Moreover, it is also possible to operate a motor by a low-voltage electric power source.

BEST MODE FOR CARRYING OUT THE INVENTION

Figure 1:
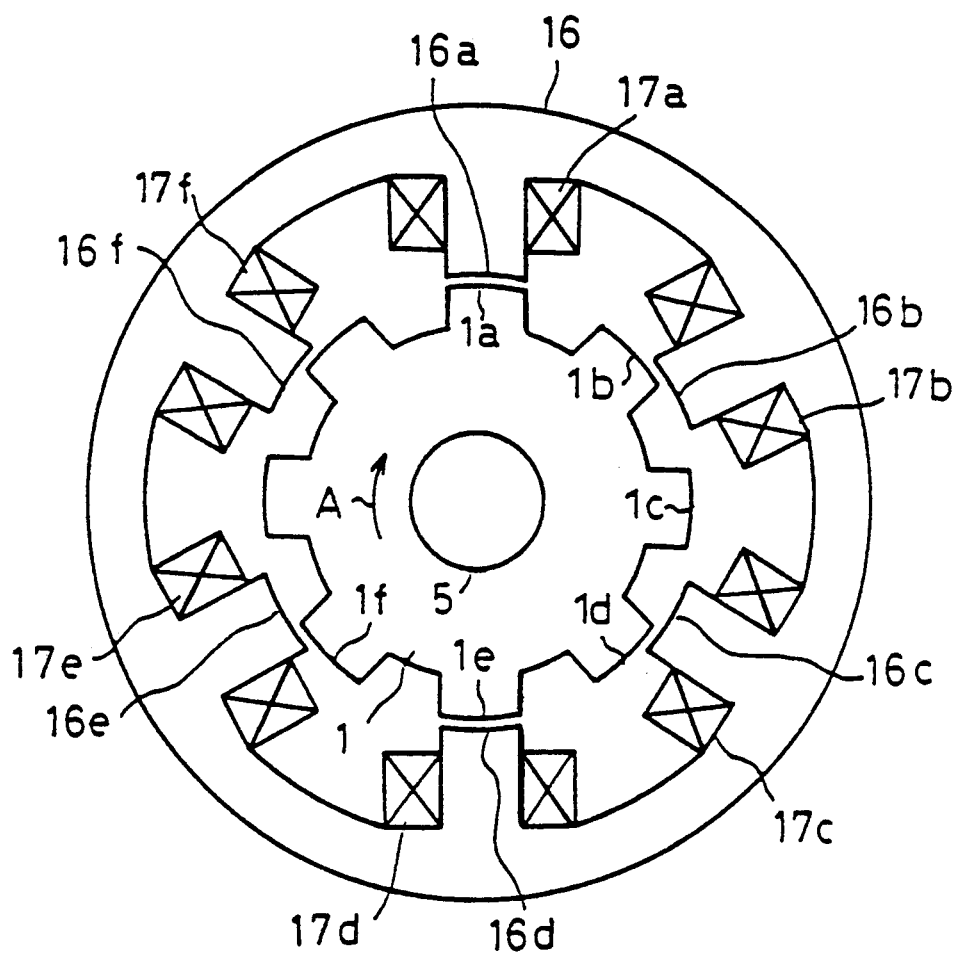
FIG. 1 is a plane view showing a three-phase half-wave reluctance type motor in accordance with the present invention.

With reference to FIG. 1 and the following drawings, embodiments of the present invention will be explained hereinafter. The same reference numeral in respective drawings denotes the same components, and thus their duplicated explanations will be omitted here. In the following explanations, all the angles are expressed by electric angles.

Next, explained hereinafter is a constitution of a three-phase half-wave reluctance type motor embodying the present invention. FIG. 1 is a plane view showing a fixed armature and a rotor.

Salient poles 1a, 1b, - - - of a rotor 1 have the same width of 180 degrees and are mutually spaced at regular intervals of 360 degrees.

The rotor 1 is made from a well-known laminated silicon steel sheets, and has a rotational shaft 5. A fixed armature 16 is provided with magnetic poles 16a, 16b, 16c, 16d, 16e and 16f, having the same width of 180 degrees and being mutually spaced at regular intervals.

The salient pole and the magnetic pole are made to have the same 180-degree width. The number of the salient poles is eight, and the number of the magnetic poles is six. The armature 16 is also made from the same means as the rotor 1. The magnetic poles 16a, 16b, - - - are associated with armature coils 17a, 17b, - - - .

Figure 3:
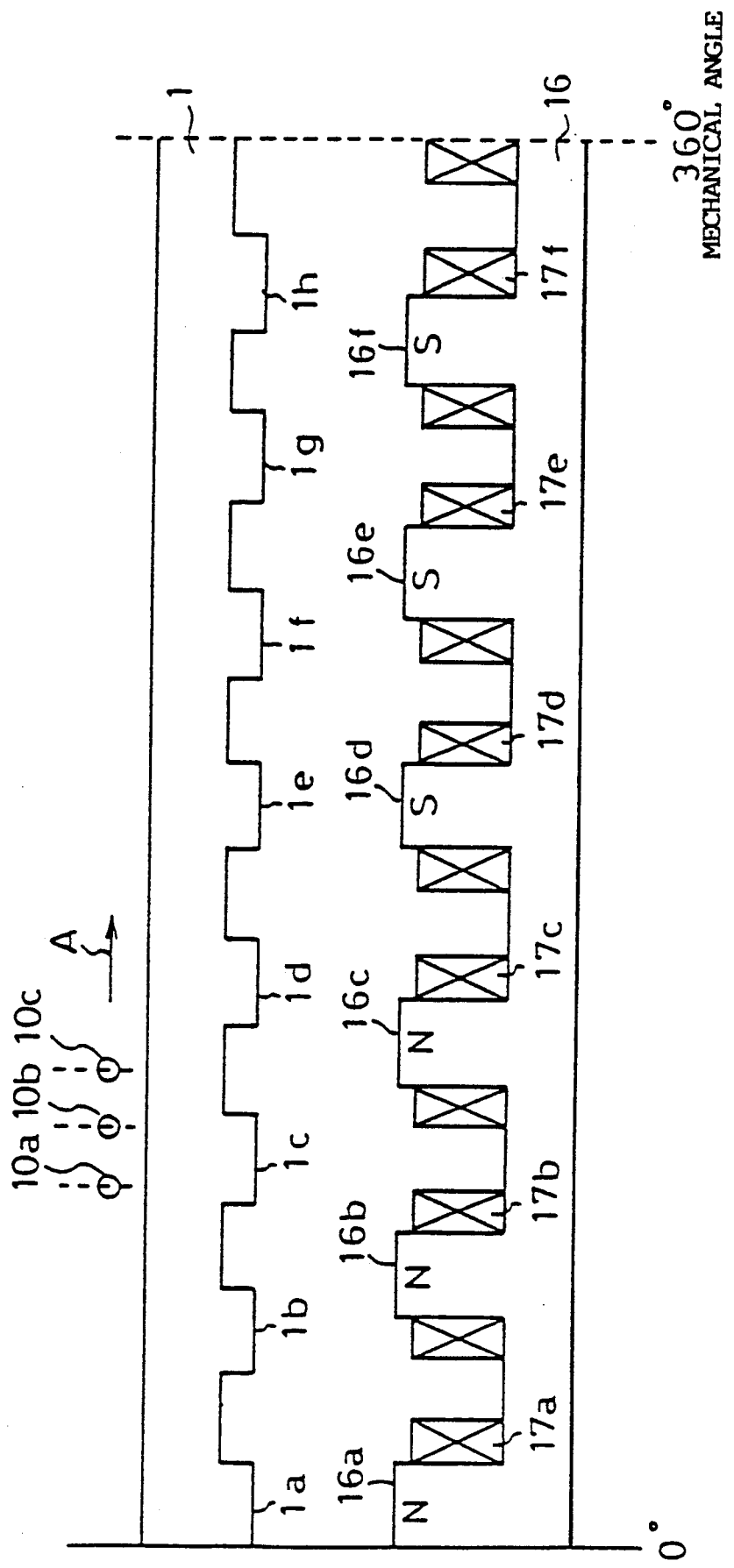
FIG. 3 is a development showing an armature and a rotor of the motor of FIG. 1.

FIG. 3 is a development of the magnetic poles and the rotor of FIG. 1. In FIG. 1, a circular ring portion 16 and magnetic poles 16a, 16b, - - - constitute a fixed armature by being fixed on an outer casing (not shown). The circular ring portion 16 is a core serving as a magnetic path.

the armature coils 17a and 17d are connected in series or in parallel, and this joint unit is referred to as an armature coil 32a. The armature coils 17b and 17e and the armature coils 17c and 17f are also connected similarly, and these joint units are referred to as an armature coil 32b and an armature coil 32c, respectively.

When the armature coil 32b is activated, the salient poles 1b and 1f are attracted and the rotor 1 rotates in a direction an arrow A. When the rotor 1 rotates 120 degrees, the armature coil 32b is deactivated, and the armature coil 32c is activated. When the rotor 1 further rotates 120 degrees, the armature coil 32c is deactivated and the armature coil 32a is activated.

A current supply mode is cyclically alternated every 120-degree rotation in the order of the mode for armature coil 32a→the mode for armature coil 32b→the mode for armature coil 32c, so that the motor can be driven as a three-phase half-wave motor.

In this case, symmetrically disposed magnetic poles are magnetized to N-poles and S-poles as shown in the drawing. Since two magnetic poles excited simultaneously are always magnetized to have opposite polarities, leaking magnetic fluxes passing non-excited magnetic poles become mutually opposite, and thus the occurrence of the counter torque can be prevented.

In order to further reduce the above-described leaking magnetic flux, No.1-phase magnetic poles 16a and 16d are respectively constituted as a set of two magnetic poles, and respective magnetic poles are magnetized to an N-pole and an S-pole by activating their corresponding armature coils. Leaking magnetic fluxes occurring in respective sets of two magnetic poles are canceled by other magnetic poles until they are almost extinguished. Other magnetic poles 16b, 16c, - - - 16f are also respectively constituted as a set of two magnetic poles, which are to be magnetized to an N-pole and an S-pole, whereby the same effect as the above can be enjoyed, and leaking magnetic fluxes are extinguished.

In this case, the number of constituent the salient poles 1a, 1b, - - - becomes 16, whereas the output torque becomes twice. The armature coils 32a, 32b, and 32c are referred to as No.1-, No.2-, and No.3-phase armature coils.

Though the number of the salient poles of the rotor 1 shown in FIG. 1 is 8, it is possible to reduce the number of the salient poles to 4 in order to reduce a diameter of the rotor 1. In this case, a number of the magnetic pole becomes 6.

FIG. 3 is a development showing salient poles and magnetic poles of the motor of FIG. 1.

Coils 10a, 10b and 10c of FIG. 3 are position detecting elements for detecting positions of the salient poles 1a, 1b, - - - , and are fixed on the armature 16 as shown in the drawings. Their coil surfaces face to side surfaces of the salient poles 1a, 1b, - - - through an air gap. The coils 10a, 10b, and 10c are spaced one another by 120 degrees. The coil is of a 100-turn air-core having a diameter of 5 mm.

Figure 6:
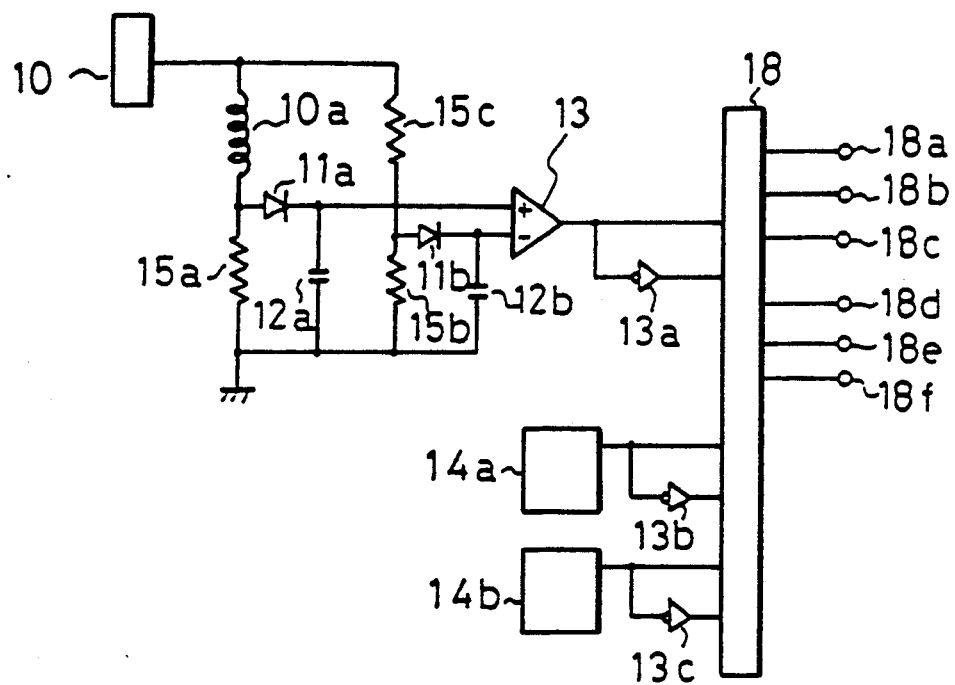
FIG. 6 is a circuit diagram showing an electric circuit of a three-phase position detecting device.

FIG. 6 shows a device for obtaining position detecting signals from the coils 10a, 10b and 10c. In FIG. 6, the coil 10a and resistances 15a, 15b and 15c constitute a bridge circuit. This bridge circuit is adjusted to balance when the coil 10a does not directly face to the salient poles 1a, 1b, - - - .

Accordingly, an output of a low-pass filter consisting of a diode 11a and a capacitor 12a and an output of a low-pass filter consisting of a diode 11b and a capacitor 12b are equal, and so an output of the operational amplifier 13 becomes a LOW-level.

An oscillator 10 provides approximately 1 MHz oscillations. When the coil 10a directly faces to the salient poles 1a, 1b, - - -, an impedance is reduced due to iron loss (i.e. eddy loss and hysteresis loss). Therefore, a voltage drop in the resistance 15a increases, and so the output of the operational amplifier 13 becomes a HIGH-level.

Figure 12:
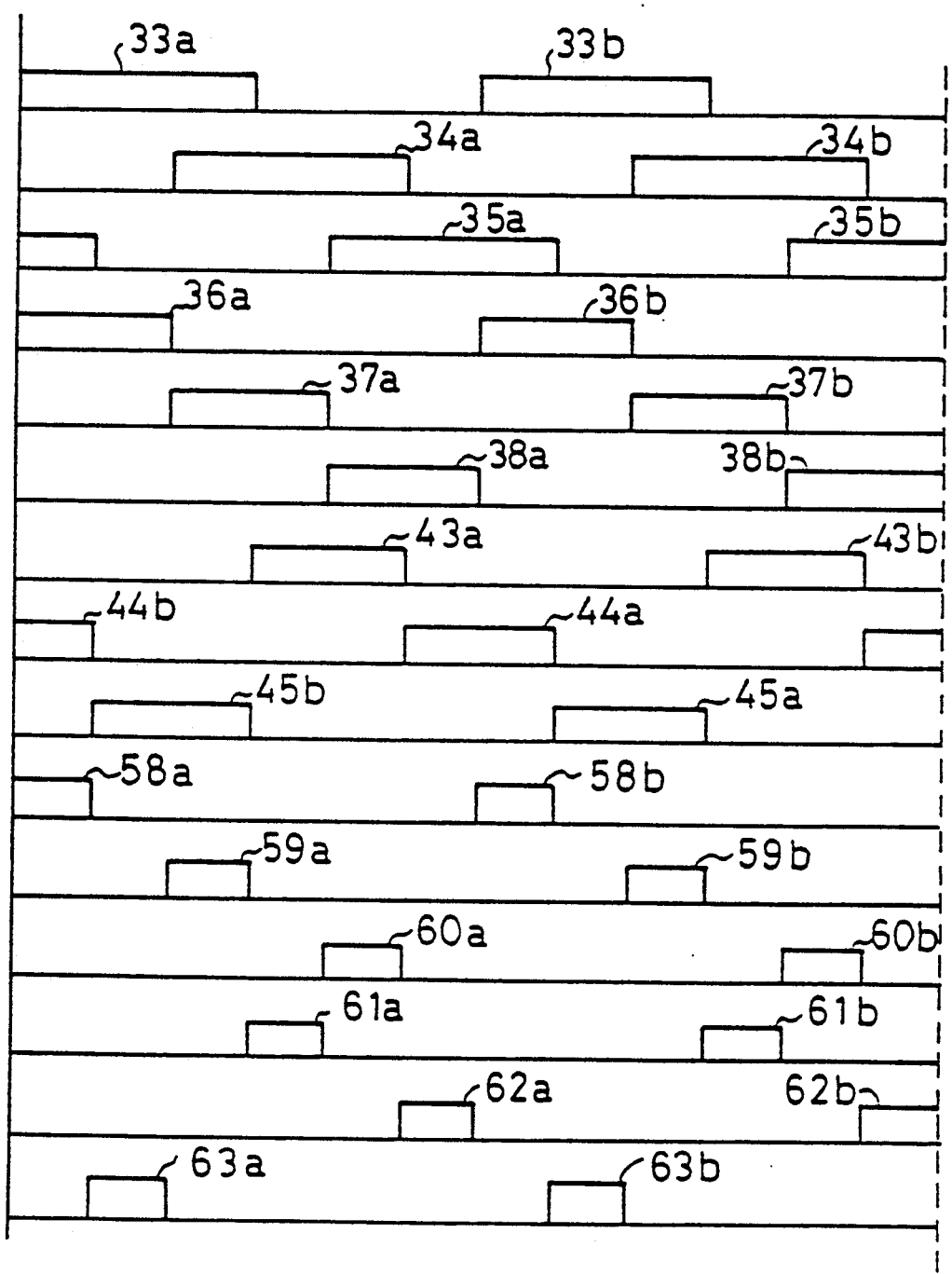
FIG. 12 is a time chart showing position detecting signals.

Inputs to the block circuit 18 are shown by curves 33a, 33b, - - - in a time chart of FIG. 12, whereas inputs supplied through an inversion circuit 13a coincide with inverted curves of the curves 33a, 33b, - - - . Block circuits 14a and 14b in FIG. 6 have the same constitution as above-described block circuits including the coils 10b and 10c, respectively. The oscillator 10 can be utilized commonly among these block circuits.

An output of the block circuit 14a and an output of the inversion circuit 13b are inputted to the block circuit 18, and their output signals take forms of curves 34a, 34b, - - - as shown in FIG. 12 and inverted curves of the curves 34a, 34b.

An output of the block circuit 14b and an output of the inversion circuit 13c are inputted to the block circuit 18, and their output signals become curves 35a, 35b, - - - as shown in FIG. 12 and inverted curves of the curves 35a, 35b. The curves 34a, 34b, - - - are delayed 120 degrees in their phases with respect to the curves 33a, 33b, - - - . In the same way, the curves 35a, 35b, - - - are delayed 120 degrees in their phases with respect to the curves 34a, 34b, - - - .

The block circuit 18 is a circuit conventionally used in a control circuit of a three-phase Y-type brushless motor. That is, the block circuit 18 is a logic circuit generating 120-degree width rectangular-waveform electric signals from terminals 18a, 18b, - - - , 18f in response to the above-described position detecting signals. Outputs from the terminals 18a, 18b, and 18c are shown by curves 36a, 36b, - - - , curves 37a, 37b, - - - , and curves 38a, 38b, - - - in FIG. 12. Outputs from the terminals 18d, 18e, and 18f are shown by curves 43a, 43b, - - - , curves 44a, 44b, - - - , and curves 45a, 45b, - - - , respectively.

The outputs of the terminal 18a and the terminal 18d have a mutual phase difference of 180 degrees. The outputs of the terminal 18b and the terminal 18e have a mutual phase difference of 180 degrees. And, the outputs of the terminal 18c and the terminal 18f have a mutual phase difference of 180 degrees.

The output signals from the terminals 18a, 18b, and 18c are successively delayed one another by an amount of 120 degrees. In the same manner, the output signals from the terminals 18d, 18e, and 18f are successively delayed one another by an amount of 120 degrees. The same effect can be obtained even if an aluminum plate synchronously rotating with the rotor 1 of FIG. 1 and having the same configuration is used instead of the salient poles 1a, 1b, - - - facing to the coils 10a, 10b, and 10c.

In a plane view of FIG. 1 and in a development of FIG. 3, the circular ring portion 16 and the magnetic poles 16a, 16b, - - - are fixed to an outer casing to constitute an armature. The circular ring portion 16 denotes a magnetic core serving as a magnetic path. The circular ring portion 16 and magnetic poles 16a, 16b, - - -are referred to as armatures or fixed armatures.

Magnetic attraction forces derived from the excited magnetic pole and the salient pole, which are symmetrically disposed about an axis, and acting in a radial direction is balanced, thereby preventing vibrations. Next, a means for supplying currents to the armature coils will be next explained with reference to FIG. 9.

Transistors 20a and 20b are respectively connected to the ends of armature coil 32a; transistors 20c and 20d to the ends of armature coil 32b; and transistors 20d and 20e to the end of armature coil 32c. The transistors 20a, 20b, 20c, - - - serve as switching elements and can be replaced by other semiconductor elements having the same effect. A DC electric power source supplies an electric power from its positive and negative terminals 2a and 2b.

When a HIGH-level electric signal is inputted from the terminal 42a while a downside input terminal of AND circuit 41a is a HIGH-level, transistors 20a and 20b are turned on to activate the armature coil 32a. In the same manner, if a HIGH-level electric signal is inputted from the terminal 42b, the transistors 20c and 20d are turned on to activate the armature coil 32b, whereas, if a HIGH-level electric signal is inputted from the terminal 42c, the transistors 20e and 20f are turned on to activate the armature coil 32c.

A terminal 40 is supplied with a standard voltage for designating an armature current. By changing a voltage of the terminal 40, an output torque can be changed. When an electric power switch (not shown) is turned on, an output of an operational amplifier 40b becomes a HIGH-level, since an input of a negative terminal of the operational amplifier 40b is lower than that of its positive terminal. Therefore, transistors 20a, 20b are turned on, and, in turn, the voltage is supplied to the current supply control circuit for the armature coil 32a. A resistance 22a is a resistance for detecting exciting currents of the armature coils 32a, 32b and 32c.

Input signals of the terminal 42a are shown as the position detecting signals 36a, 36b, - - - in FIG. 12, and input signals of the terminals 42b and 42c are shown as the position detecting signals 37a, 37b, - - - , and as the position detecting signals 38a, 38b, - - - , respectively.

Figure 7:
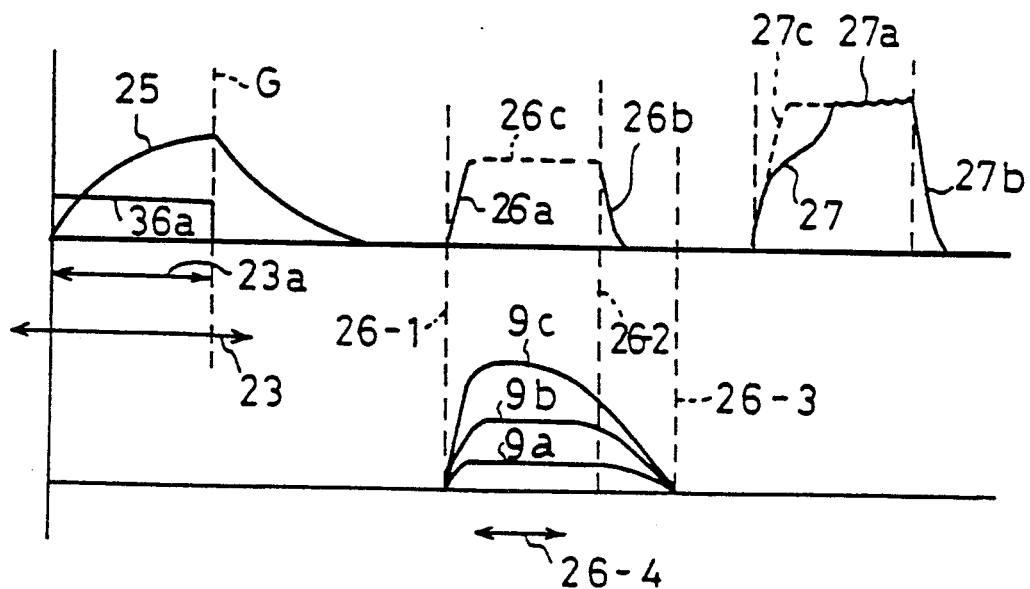
FIG. 7 is a time chart showing armature currents of the armature coils and an output torque.

One of above-described position detecting signal curves is shown as a curve 36a in a time chart of FIG. 7. The armature coil 32a is supplied with an exciting current during a time period corresponding to this curve 36a. An arrow 23a shows a current supply angle of 120 degrees.

In an initial stage of the current supply period, the building-up of the exciting current is delayed due to an inductance of the armature coil. If the current supply stopped, normally, magnetic energy stored in the armature coil is discharged to return to the electric power source. Therefore, the current decreases as shown by a second half portion of the curve 25 i.e. a right side of the dotted line G.

A section generating a positive torque is a 180-degree section shown by an arrow 23, and so counter torque is generated, causing the fall of output torque and its efficiency. This phenomenon becomes so conspicuous as the speed increases that the motor will become unable to stand the practical use any longer.

This is because a time width of a positive torque generating section 23 decreases in proportion to an increase of the rotational speed, while a time width of a counter torque generating section will not vary even if the motor speed increases.

The same explanation applies to the current supply to the armature coils 32b and 32c based on other position detecting signals 37a and 38a.

Since a building-up portion of the curve 25 is also delayed, the output torque is decreased. That is, torque reduction occurs. This is because the magnetic pole and the salient pole interact to close the magnetic path, thereby producing a large inductance.

The reluctance type motor is advantageous in that a large output torque can be obtained but is disadvantageous in that its rotating speed is not large enough because of the generation of the above-describe counter torque and torque reduction.

Figure 9:
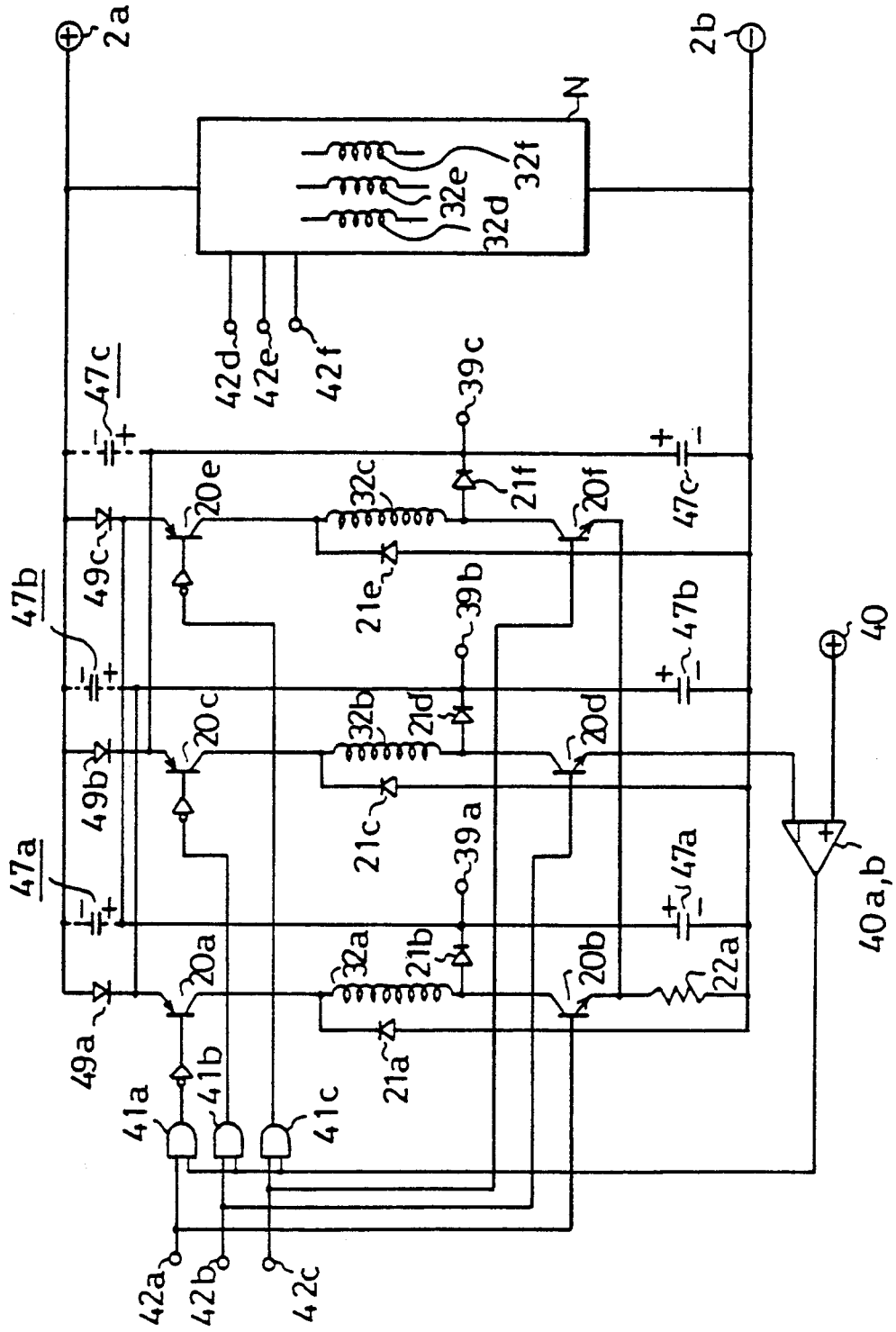
FIG. 9 is a circuit diagram showing a current supply control circuit for armature coils of a three-phase half-wave current supply mode.

An apparatus in accordance with the present invention is characterized in that the above-mentioned disadvantage can be removed by additionally providing back-flow preventing diodes 49a, 49b and 49c, and capacitors 47a, 47b and 47c shown in FIG. 9.

When the current supply is terminated at the terminal end of the curve 36a, magnetic energy stored in the armature coil 32a is discharged through the diodes 21b and 21a to the capacitor 47a to charge it up to a high voltage with polarities shown in the drawing, as the current is prevented from returning to the DC electric power source due to a function of the back-flow preventing diode 49a. Accordingly, the magnetic energy is sharply extinguished, and the current decreases steeply.

Curves 27, 27a and 27b shown in the time chart of FIG. 7 show a current curve flowing through the armature coil 32a. The dotted lines on both sides of the curve are spaced by 120 degrees. As seen from curve 27b, the armature current decreases steeply to prevent the generation of counter torque. The capacitor 47a is charged up to a high voltage and held to this value.

The position detecting signal (i.e. the curve 38a) is inputted into the terminal 42c after a predetermined time has elapsed to turn on the transistors 20e, 20f, thereby activating the exciting coil 32c. In this case, as the charged voltage of the capacitor 47a is applied to the exciting coil 32c, a voltage becomes a high voltage, and an exciting current builds up quickly. The same function and effect can be obtained even if the capacitor 47a is removed to be replaced with the capacitor 47a.

By virtue of such a function, the exciting current builds up rapidly as shown by the curve 27. The building-up portion of the current 27 becomes slow or moderate at its intermediate portion, since the magnetic energy is transformed into thermal energy due to copper losses of coils and iron losses of magnetic cores when the magnetic energy is transferred between armature coils. A means for removing such a disadvantage will be discussed later. As is explained above, the torque reduction and the counter torque can be removed, and an output torque can be increased since the exciting current substantially takes the rectangular-waveform.

When the exciting coil 32c is deactivated, the magnetic energy stored in it is discharged through the diodes 21e and 21f into the capacitor 47c to charge and hold it to a high voltage. When the position detecting signal (i.e. the curve 57a) is inputted into the terminal 42b, the transistors 20c and 20d are turned on to initiate an activation of the armature coil 32b, and concurrently electrostatic energy charged in the capacitor 47c is discharged into the armature coil 32b to make its exciting current build up sharply.

In this section, the back-flow preventing diode 49b prevents the above-described electrostatic energy from returning to the electric power source. Only when the voltage of the capacitor 47c has become equal to the voltage applied between the terminals 2a and 2b, the electric power is supplied to initiate the activation of the armature coil.

When the armature coil 32b is deactivated, the capacitor 47b is charged up and held to a high voltage through the diodes 21c and 21d, and the current decreases steeply. When the armature coil 32a is next activated, the current builds up sharply by the high voltage charged in the capacitor 47b. The same function and effect can be obtained even if the capacitors 47a, 47b and 47c are removed to be replaced with capacitors 47a, 47b and 47c.

As can be understood from the foregoing explanation, the building-up and the trailing-off of each armature coil will become sharp, and thus the object of the present invention can be accomplished.

In order to obtain a high-speed and high-torque three-phase half-wave motor, it is preferable to select the capacitors of smallest possible capacitance for the capacitors 47a, 47b and 47c in consideration of the withstand voltage characteristics of circuit components.

When an electromagnetic braking is to be applied during a normal rotation of the motor, the position detecting signals inputted into the terminals 42a, 42b, - - -should be exchanged to generate a reverse torque. Furthermore, the object can be accomplished by turning on three transistors in response to an output of the operational amplifier 40b so that the outputs from the terminals 39a, 39b and 39c are returned through these transistors to the electric power source.

Next, a chopper circuit will be explained. When the armature current of the armature coil 32a increases to cause the voltage of the resistance 22a, which is provided for detecting the armature current value, drops below the voltage of the standard voltage terminal 40 (i.e. an input voltage of the positive terminal of the operational amplifier 40b), a downside input terminal of the AND circuit 41a becomes a LOW-level. This causes the transistors 20a and 20b to be turned off, and the exciting current to decrease.

Due to the hysteresis characteristics of the operational amplifier 40b, when the predetermined value is decreased, the output of the operational amplifier 40b returns to a HIGH-level to turn on the transistors 20a and 20b, and to increase the exciting current. Repeating such a cycle, the exciting current is maintained at a predetermined value.

A section indicated by the curve 27a in FIG. 7 is a chopper-controlled section. A height of the curve 27a is regulated by a voltage of the standard voltage terminal 40.

The armature coil 32b of FIG. 9 is activated when the transistors 20c and 20d are turned on in accordance with the widths of the position detecting signal curves 37a, 37b, - - - inputted from the terminal 42b, and the chopper control is carried out by the operational amplifier 40b, the resistance 22a and the AND circuit 41b.

Above-described conditions also applies to the armature coil 32c. That is, the current supply control for the armature coil 32c is executed by inputting the position detecting signal curves 38a, 38b, - - - of FIG. 12 to the terminal 42c.

The current supply sections for the respective armature coils can be initiated from any point within an approximately 30-degree section after the salient poles enter into the magnetic poles. The positions at which the coils 10a, 10b and 10c as the position detecting element are to be fixed on the side of the armature can be adjusted or changed in consideration of the rotational speed, efficiency and output torque.

As is apparent from the foregoing description, the motor according to this embodiment can be operated at a high speed with good efficiency and large output as a three-phase half-wave current supply type motor. Thus, the object of the present invention can be accomplished. In the case of a three-phase full-wave current supply mode, the same object can be accomplished by combining two sets of half-wave current supply circuits by means of above-described measure. Its detail will be explained later.

Figure 8:
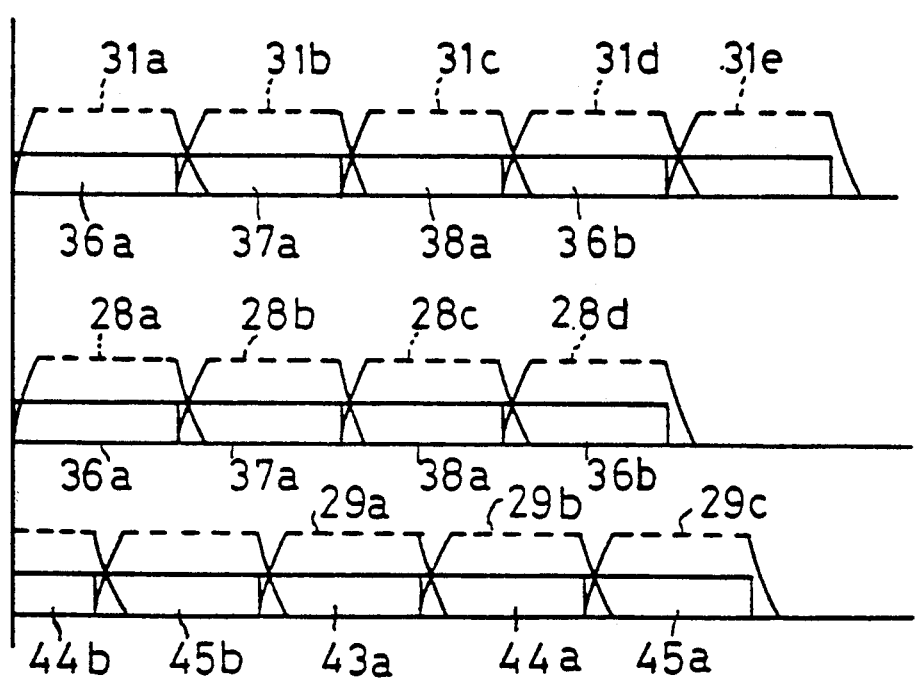
FIG. 8 is a time chart showing position detecting signals and armature currents.

Curves 36a, 37a, - - - shown in a first step of the time chart of FIG. 8 are position detecting signals, and curves 31a, 31b, - - - are armature currents curves of corresponding armature coils.

Curves 26a, 26b, and 26c shown in a first step of FIG. 7 is a current supply curve for the armature coil. A gap between a dotted line 26-1 and a dotted line 26-2 is a 120-degree width of the position detecting signal. A gap between the dotted line 26-1 and a dotted line 26-3 is a 180-degree width of the output torque generating section.

Curves 9a, 9b and show output torque curves. At the point of the dotted line 26-1, the current supply is initiated, and concurrently the salient poles begin entering the magnetic poles. The curve 9a represents a case where a current supplied to the armature coil is small. Its torque is relatively flat. However, as shown by the curves 9b, 9c, a peak value of the torque tends to shift toward a left side as the current value increases, and also a width of the peak value becomes narrower.

In view of above-described torque characteristics and the supplied current value. It is preferable to adjust the fixing points of the position detecting coils 10a, 10b and 10c so that an initiation point of the current supply can be set to an intermediate point of a 30-degree section after the salient poles begin entering the magnetic poles.

Figure 2:
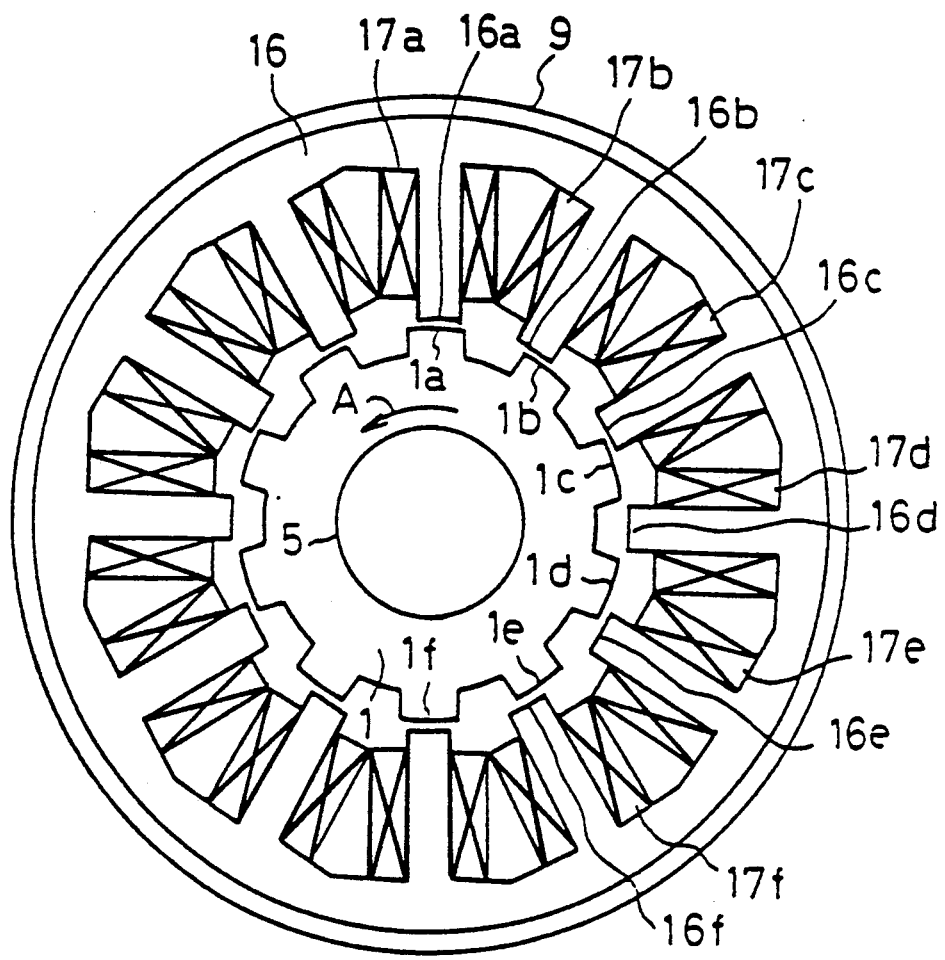
FIG. 2 is a plane view showing a three-phase full-wave reluctance type motor in accordance with the present invention.
Figure 4:
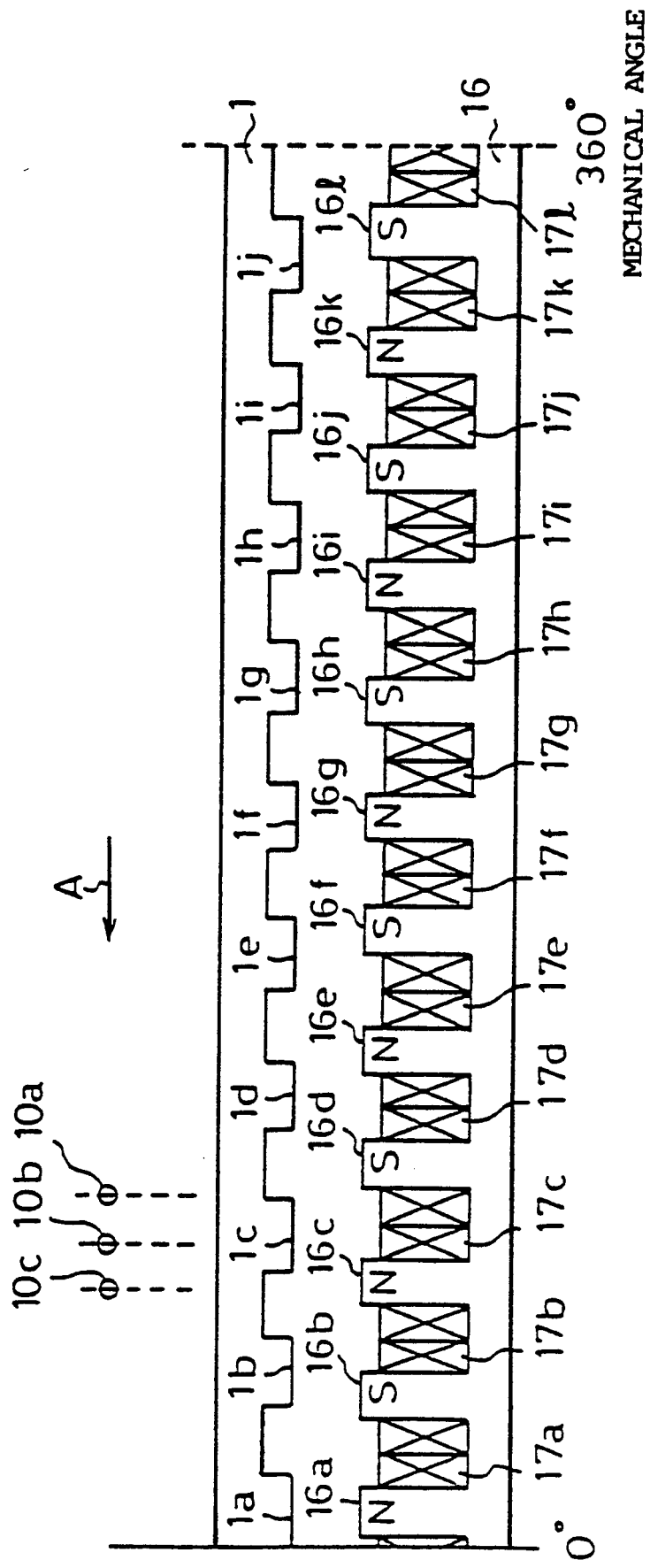
FIG. 4 is a development showing an armature and a rotor of the motor of FIG. 2.

Next explained is an embodiment in which the present invention is applied to a three-phase full-wave reluctance type motor. One embodiment showing the constitution of such a motor is shown in FIG. 2. FIG. 4 shows its development.

As shown in FIGS. 2 and 4, ten salient poles 1a, 1b- - -being disposed one another at regular intervals with a 180-degree width are formed on the magnetic rotor 1, which is fixed on the rotor 5. A fixed armature 16 is equipped with 12 magnetic poles 16a, 16b, - - - having a 120 -degree width to be wound by associated armature coils. The armature 16 is fixed on an inside surface of the outer casing 9. The rotor 5 is rotatably supported on bearings provided on the side plates of the outer casing 9. The magnetic poles 16a, 16b, - - - are associated with armature coils 17a, 17b, - - - , respectively.

Position detecting coils 10a, 10b, and 10c are spaced one another by 120 degrees and fixed on the side of the armature 16 at the positions shown in the drawing to face the side surfaces of the salient poles 1a, 1b - - - . An electric circuit for obtaining position detecting signals from the coils 10a, 10b and 10c is the previously described electric circuit of FIG. 6 which generates the position detecting signals shown by respective curves in the time chart of FIG. 12.

Respective magnetic poles are magnetized by the armature coils to have N- or S-polarity shown in the drawing. The armature coils 17a and 17g are connected in series or in parallel with each other to constitute an armature coil 32a. On the other hand the armature coils 17b and 17h, the armature coils 17c and 17i, the armature coils 17d and 17j, the armature coils 17e and 17k, and the armature coils 17f and 17l are similarly constituted and are referred to as armature coils 32d, 32b, 32e, 32c and 32f, respectively.

The armature coils 32a, 32b, and 32c are activated by amounts corresponding to the position detecting signal curves 36a, 36b, - - - , 37a, 37b, - - - and 38a, 38b, - - - of FIG. 12, whereas the armature coils 32d, 32e and 32f are activated by amounts corresponding to the position detecting signals 43a, 43b, - - - , 44a, 44b, - - - and 45a, 45b, - - - , respectively. Then, the rotor 1 rotates in a direction of an arrow A as a three-phase full-wave type motor.

An above-described current supply mode can be expressed as follows: the armature coils 32a, 32b and 32c are referred to as No.1-, No.2- and No.3-armature coils, respectively, whereas the armature coils 32d, 32e and 32f are referred to as No.1-, No.2- and No.3-armature coils, respectively. Both pairs are activated by a half-wave current supply mode, respectively.

A No.1-phase armature coil is constituted by the No.1- and No.1-armature coils. No.2-phase armature coil and No.3-phase armature coil are constituted by the No.2-and No.2-armature coils, and the No.3- and No.3-armature coils, respectively.

The position detecting signal curves 36a, 36b, - - - , 37a, 37b, - - - , and 38a, 38b, - - - are referred to as No.1-, No.2-, and No.3-phase position detecting signals, respectively. The position detecting signal curves 43a, 43b, - - - , 44a, 44b, - - - , and 45a, 45b, . . . are referred to as No.1-, No.2-, and No.3-phase position detecting signals, respectively. A current supply width of the armature coil becomes 120 degrees.

A means for supplying currents to the armature coils is explained with reference to FIG. 9. In FIG. 9, the means for supplying currents to the armature coils 32a, 32b, and 32c is the same as the one explained in the description of the previous three-phase half-wave current supply mode, and so its explanation is omitted here.

Armature current curves 28a, 28b, - - - of the armature coils 32a, 32b, and 32c by the position detecting signals 36a, 37a, - - - are shown in a second step of the time chart of FIG. 8. A block circuit N of FIG. 9 shows a current supply circuit for the armature coils 32d, 32e and 32f, and has the same constitution as a circuit of the armature coils 32a, 32b, and 32c on the left.

The position detecting signal curves 43a, 43b, - - - , the curves 44a, 44b, - - - , and the curves 45a, 45b, - - - are inputted from the terminals 42d, 42e and 42f, respectively to activate the armature coils 32d, 32e and 32f by an amount of 120 degrees, and the building-up and the trailing-off of the armature current become sharp by the function of the back-flow preventing diodes and small-capacitance capacitors.

Armature current curves by the position detecting signal curves 43a, 44a, 45a, - - - are shown as curves 29a, 29b, 29c, - - - in FIG. 8. A composition of the torques generated by respective armature coils become an output torque of the motor. Dotted portions of the curves 28a, 28b, - - -, the curves 29a, 29b, - - - are portions regulated to a predetermined current value by the previously described chopper circuit. In the case where the electric power source is a low-voltage power source such as a battery, the dotted line portions become flat currents proportional to the difference between the electric power voltage and the reverse electromotive force.

However, in any of the above-described three-phase half-wave and full-wave current supply operation modes, the magnetic energy is reduced due to copper losses and iron losses when the magnetic energy is transferred between the armature coils. For this reason, the building-up characteristics of the armature coil is deteriorated as shown by the curve 27 in the first step of FIG. 7. Next, a means for improving the building-up characteristics as shown by the curve 27c will be explained next.

In FIG. 12, the electric signals of the curves 58a, 58b, - - - having a 60-degree width are obtained as outputs from an AND circuit when the curves 36a, 36b, - - - and curves 44a, 44b, - - - are inputted as two inputs. The electric signals of the curves 59a, 59b, - - -, the curves 60a, 60b, - - -, the curves 61a, 61b, - - -, the curves 62a, 62b, - - -, and the curves 63a, 63b, - - - having a 60-degree width and a 360-degree phase difference can be obtained in the same manner.

Figure 10:
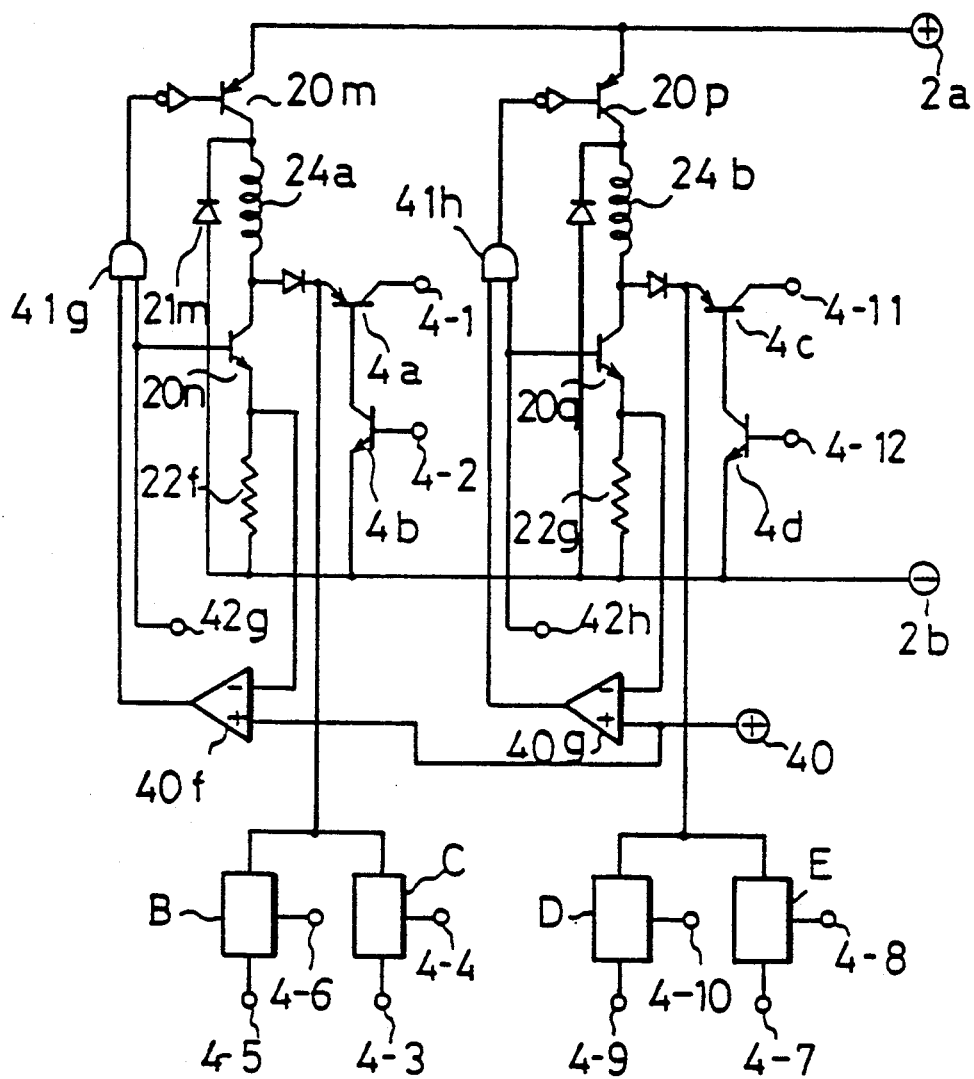
FIG. 10 is a circuit diagram showing a modification of the electric circuit of FIG. 9 modified by adding inductance coils.

The electric signals of the curves 58a, 58b, - - -, the curves 59a, 59b, - - -, the curves 60a, 60b, - - - are inputted from the terminal 42g of FIG. 10, and the transistors 20m and 20n are turned on to activate the inductance coil 24a. The inductance coil 24a is a coil wound around a closed magnetic core, and its inductance value is substantially the same as those of the armature coils 32a, 32b, - - -.

If the armature current increases, the voltage drop in the resistance 22f increases, and if this voltage drop exceeds an input value of the plus terminal of the operational amplifier 40f, i.e., the voltage of the standard voltage terminal 40, the output terminal of the operational amplifier 40f is inverted to a LOW-level. Therefore, an output of the AND circuit 41g also becomes a LOW-level, and the transistor 20m is turned off.

The magnetic energy stored in the inductance coil 24a is discharged as a current flowing through the transistor 20n, the resistance 22f, and the diode 21m. When the current value is decreased down to a predetermined value, the output of the operational amplifier 40f is returned to a HIGH-level due to its hysteresis characteristics to turn on the transistor 20m. Then, the current flowing through the inductance coil 24a increases. By repeating such a current supply, a chopper circuit is constituted to restrict the current supply in accordance with the voltage of the standard voltage terminal 40.

As the input signal of the terminal 42g is extinguished at the terminal ends of the position detecting signal curves 58a, 59a and 60a, the transistors 20m and 20n are turned off. Then, the magnetic energy stored in the inductance coil 24a is outputted from the terminal 4-1 through the diode and the transistor 4a.

As the position detecting signal curves 36a, 36b, - - - are inputted to the terminal 4-2, the transistors 4a and 4b are turned on in response to these input signals. Thus, when the above-described inductance coil 24a is deactivated at the central portions of the curves 36a, 36b, - - -, an output is obtained from the terminal 4-1 through the transistor 4a. As this output is supplied to the terminal 39a of FIG. 9, the capacitor 47a is charged, and thus charged energy is utilized to compensate the previously described thermal loss occurring when the magnetic energy is transferred between armature coils.

Therefore, the above-described process provides a function and an effect to make sharp the building-up portion of the curve 27 of FIG. 7 as shown by the curve 27c.

The block circuits B and C of FIG. 10 have the same constitution as the circuits of the transistors 4a and 4b. The position detecting signal curves 37a, 37b, - - -and curves 38a, 38b, - - - are inputted to the terminals 4-3 and 4-5, and the output signals from the terminals 4-4 and 4-6 are inputted to the terminals 39b and 39c of FIG. 9, respectively. The terminals 4-3 and 4-5 correspond to the terminal 4-2, and the terminals 4-4 and 4-6 to the terminal 4-1. Hence, the same function and effect can be obtained when the armature coils 32b and 32c are deactivated. Thus, the armature current builds up sharply. Above-described explanation also applies to a three-phase half-wave current supply mode.

In case of a three-phase full-wave current supply mode, a circuit including an inductance coil 24b is added. Electric signals of the curves 61a, 61b, - - -, the curves 62a, 62b, - - -, and the curves 63a, 63b, - - -of FIG. 12 are inputted to the terminal 42h. Electric signals of the curves 43a, 43b, - - -, the curves 44a, 44b, - - -, and the curves 45a, 45b are inputted into the terminals 4-12, 4-7, and 4-9, respectively. The operational amplifier 40g, the AND circuit 41h, the transistors 20p and 20q, and the resistance 22g constitute a chopper circuit. Furthermore, the armature current is controlled to a predetermined value regulated by the standard voltage terminal 40 in the same manner as the inductance coil 24a.

The block circuit D and E have the same constitution as the circuits of the transistors 4c and 4d. The terminals 4-8 and 4-10 correspond to the terminal 4-11, and the terminals 4-7 and 4-9 correspond to the terminal 4-12. The electric signals of the curves 43a, 43b, - - -, the curves 44a, 44b, - - -, and the curves 45a, 45b, - - - of FIG. 12 are inputted to the terminals 4-12, 4-7, and 4-9. The three capacitors for storing the magnetic energies of the armature coils 32d, 32e and 32f of FIG. 9 are charged with the outputs from the terminals 4-10, 4-8 and 4-10. Thus, the thermal loss occurring when the magnetic energy is transferred between armature coils can be compensated.

As can be understood from the foregoing explanation, the object of the present invention can be accomplished even in the case of the three-phase full-wave current supply mode. In the previous embodiment, the building-up curve shows a delay at its intermediate portion as shown by the curve 27 of FIG. 7, but the present embodiment can eliminate this delay as indicated by a dotted curve 27c. Thus, the exciting current builds up rapidly, and then becomes flat due to the effect of chopper function.

Thus, by virtue of this substantially rectangular-waveform current, the output torque can be increased, and ripple components of the output torque can be reduced.

Figure 5:
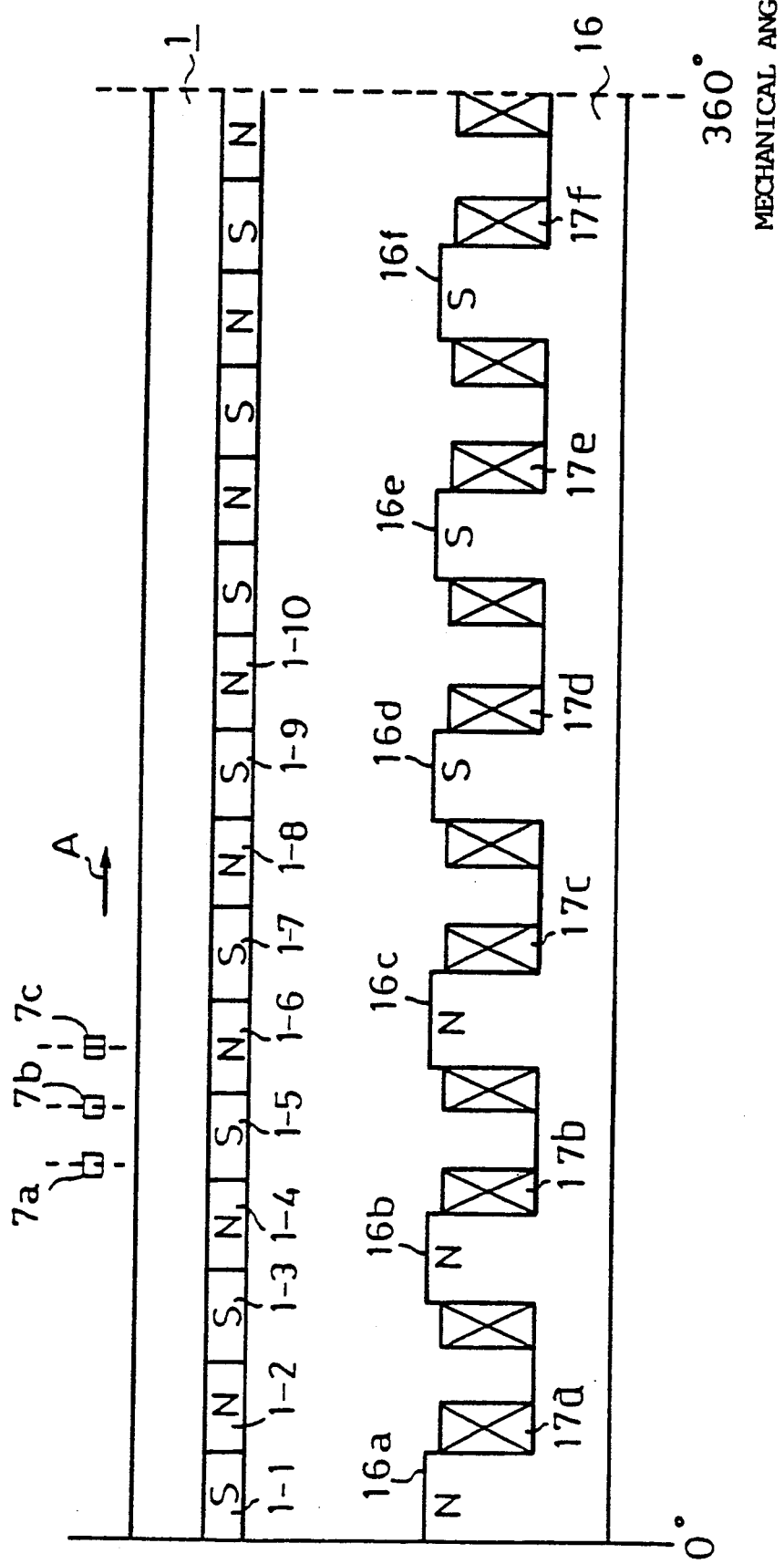
FIG. 5 is a development showing a fixed armature and a magnet rotor of a DC motor having a magnet rotor.

Next explained is an embodiment which embodies the present invention in a three-phase DC motor having a magnet rotor. FIG. 5 is a development of a magnet rotor 1 and a fixed armature 16. Sections indicated by reference numerals 1-1, 1-3, - - - are magnetized to be S-poles, while sections indicated by reference numerals 1-2, 1-4, - - - are magnetized to be N-poles. Respective N-and S-magnetic poles are closed with their magnetic paths by a mild steel cylinder. Opening ends of the magnetic paths face to magnetic poles 16a, 16b, - - - to function as magnetic fields.

Magnetic poles 16a, 16b, - - - are wound with armature coils 17a, 17b, - - -. Above-described constitution is that of a known DC motor of three-phase full-wave current another by 120 degrees and face to N- and S-magnetic poles 1-1, 1-2, - - - . Output signals from the Hall elements undergo a logic processing by a conventional circuit to obtain respective position detecting signals shown in FIG. 12. A serial or parallel connecting unit of armature coils 17a and 17d is referred to as an armature coil K. A similar connecting unit of armature coils 17b and 17e is referred to as an armature coil L, and a similar connecting unit of armature coils 17c and 17f is referred to as an armature coil M.

When the armature coils K, L and M are activated to let their armature currents flow in normal directions in response to the position detecting signal curves 36a, 36b, - - -, the curves 37a, 37b, - - -, the curves 38a, 38b, - - - of FIG. 12, and further the armature coils K, L and M are activated to let their armature currents flow in reverse directions in response to the position detecting signal curves 43a, 43b, - - -, the curves 44a, 44b, - - -, the curves 45a, 45b, - - - of FIG. 12, the magnet rotor 1 rotates in the direction of an arrow A so as to function as a three-phase DC motor.

Figure 11:
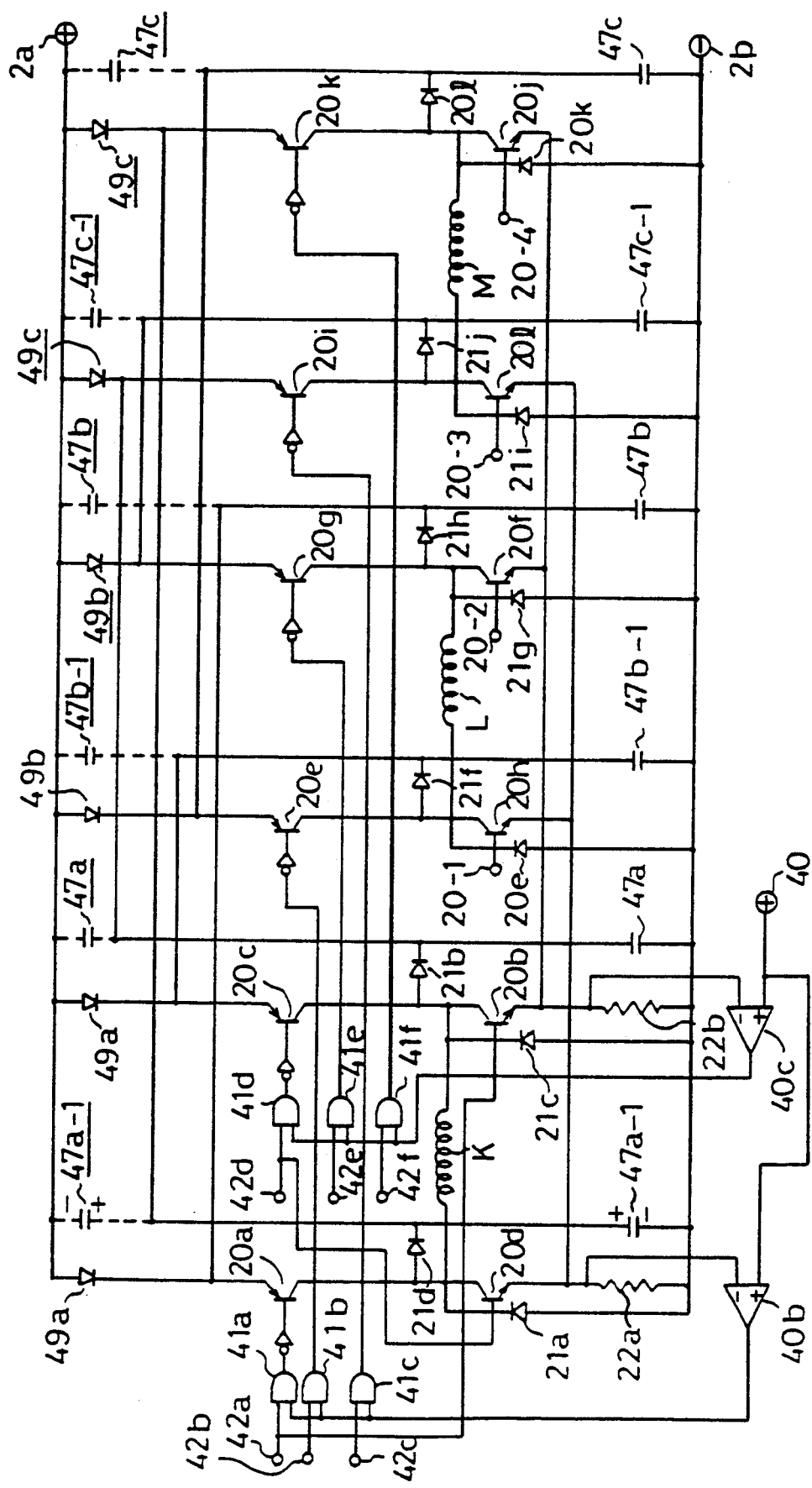
FIG. 11 is a circuit diagram showing a current supply control circuit for armature coils of a DC motor having a magnet rotor.

Next, with reference to FIG. 11, a current supply control circuit for respective armature coils is explained. When the transistors 20a and 20b are turned on, the armature coil K is activated to let its armature current flow in a right (i.e. a normal) direction, whereas, when the transistors 20c and 20d are turned on, the armature coil K is activated to let its armature current flow in a left (i.e. a reverse) direction.

With respect to the armature coils L and M, above-described circumstances are quite similar, and so, by successively turning on two transistors positioned symmetrically on a diagonal line, the armature coils L and M are activated in the normal and reverse direction, respectively.

The position detecting signal curves 36a, 36b, - - -, the curves 37a, 37b, - - -, and the curves 38a, 38b, - - - of FIG. 12 are inputted to the terminals 42a, 42b and 42c, and the position detecting signal curves 43a, 43b, - - - of FIG. 12 and two rows of electric signals indicated below the curves 43a, 43b, - - - are inputted to the terminals 42d, 42e and 42f.

Terminals 20-2 and 20-4 are connected to terminals 42b and 42c, respectively. In response to the input signals from the terminals 42a, 42b, and 42c, their corresponding transistors are turned on, and thus the armature coils K, L and M are activated to let their armature current flow in the normal directions.

As a result, the motor can be operated as a DC motor having a 120-degree current supply width of three-phase half-wave current supply mode. The armature coils K, L and M become normal-direction current supply mode. In this case, the armature coils are referred to as No.1-phase armature coil, No.2-phase armature coil, and No.3-phase armature coil, respectively.

Terminals 20-1 and 20-3 are connected to the terminals 42e and 42f, respectively. In response to the input signals from the terminals 42d, 42e and 42f, their corresponding transistors are turned on, and, therefore, the armature coils K, L and M are activated to let their armature currents flow in reverse directions.

Accordingly, the motor can be operated as a DC motor having a 120-degree current supply width of three-phase half-wave current supply mode. In this case, the armature coils K, L and M are referred to as No.1-phase armature coil, No.2-phase armature coil, and No.3-phase armature coil, respectively. The No.1- and No.1-phase armature coils, normal- and reverse-direction current supply modes of the armature coil K; the No.2- and No.2-phase armature coils normal- and reverse-direction current supply modes of the armature coil L; and, the No.3- and No.3-phase armature coils, normal- and reverse-direction current supply modes of the armature coil M.

In the case where the armature coils K, L and M are wound by the bifilar winding, these armature coils K, L and M respectively become one set of two armature coils. Therefore, above-described No.1- and No.1-armature coils indicate the armature coil K consisting of one set of two armature coils wound by the bifilar winding. Other armature coils can be regarded in the same manner.

As can be understood from the foregoing explanation, the No.1-, No.2- and No.3-phase armature coils correspond to armature coils 32a, 32b and 32c of FIG. 9, respectively. The components for controlling the armature current of the armature coil 32a are the AND circuit 41a, the transistors 20a and 20b, the diodes 21a and 21b, and the diode 49a, and the capacitor 47a, which provide the same functions and effects with those of the components suffixed with the same reference numerals in FIG. 11, in the normal-direction current supply mode of the No.1-phase armature coil, i.e. the armature coil K. That is, the No.1-phase armature coil is activated in response to the input signals from the terminal 42a, and the armature current decreases sharply.

The components and circuits for controlling armature currents of the armature coils 32b and 32c of FIG. 9 have the same functions and effects as the normal-direction current supply circuits for the No.2- and No.3-phase armature coils of FIG. 10, i.e. the armature coils L and M.

The components (i.e. the diodes 49a, 49b and 49c, the capacitors 47a-1, 47b-1 and 47c-1, the transistors 20c, 20d, - - -, the diodes 2d, 21f, - - - and the like) have the same functions and effects for controlling reverse-direction armature currents of the No.1-, No.2- and No.3-phase armature coils of FIG. 11, i.e. the armature coils K, L and M.

The chopper circuit constituted by the operational amplifier 40b, the resistance 22a, and the chopper circuit constituted by the operational amplifier 40c and the resistance 22b have the same function and effect as the circuit of FIG. 9. Thus, the motor can be operated as a three-phase full-wave DC motor, and the armature current can be controlled to a predetermined value regulated by the voltage of the standard voltage terminal 40 through a chopper circuit when necessary. Thus, the normal- or reverse-direction armature currents of the armature coils K, L and M can be built up and decreased steeply. Hence, the generation of counter torque and torque reduction can be suppressed, to obtain the motor capable of rotating at a high speed with good efficiency, thereby enabling to accomplish the object of the present invention. Furthermore, the same function and effect can be obtained even if the capacitors 47a, 47a-1, 47b, 47b-1, - - - are replaced with capacitors 47a, 47a-1, 47b, 47b-1, - - -.

Next, a constitution of a three-phase half-wave reluctance type motor embodying the present invention will be explained. For FIGS. 1 to 3, explanations will be omitted here, since they have already been made previously.

Figure 15:
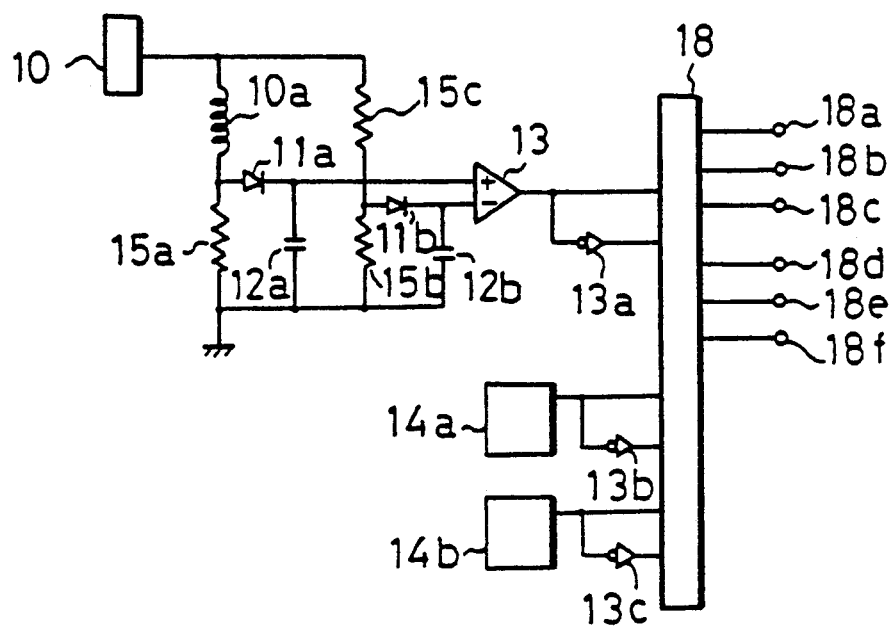
FIG. 15 is a circuit diagram showing an electric circuit of a three-phase position detecting device.

FIG. 15 shows a device for obtaining position detecting signals from the coils 10a, 10b and 10c; however, its constitution is the same as that of FIG. 6, and has already been explained, so that the explanation is omitted here.

Input signals of the block circuit 18 are shown as curves 33a, 33b, - - - in the time chart of FIG. 12, and input signals obtained through the inversion circuit 13a become inverted signals of the curves 33a, 33b, - - - . Block circuits 14a and 14b have the same constitutions as the above-described block circuits including coils 10b and 10c, respectively. Their constitutions are previously described with reference to FIG. 6, and so the same explanations are omitted here.

Magnetic attraction forces derived from the excited magnetic pole and the salient pole, which are symmetrically disposed about an axis and acting in a radial direction, are balanced, and thus vibrations are suppressed from generating. A means for supplying currents to the armature coils is next explained with reference to FIG. 21.

Downside ends of the armature coils 32a, 32b, and 32c are connected to transistors 20a, 20b and 20c. The transistors 20a, 20b and 20c serve as switching elements and can be replaced by other semiconductor elements having the same effect. A DC electric power source supplies an electric power from its positive and negative terminals 2a and 2b.

Figure 16:
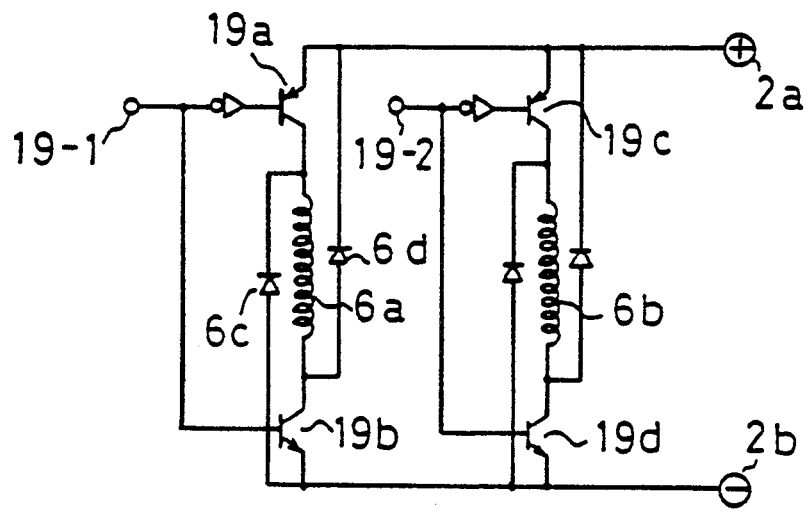
FIG. 16 is a current supply control circuit for conventional armature coils.

This embodiment is characterized in that the transistors 20a, 20b and 20c are connected to the downside ends of the armature coils, i.e., the negative-terminal side of the electric power source, and so the input circuit for activating the armature coils is simplified. A circuit shown in FIG. 16 is a conventionally known one, in which the transistors 19a, 19b, - - - are connected to both ends of the armature coils 6a and 6b. Accordingly, the number of the transistor is required to be twice the number of the armature coils. The transistors 19a, 19b, - - - are expensive as they act as power elements. Furthermore, another electric power source is required for controlling the transistors 19a and 19c, which are provided on a positive-terminal side of the electric power source, in response to the input signals from the terminals 19-1 and 19-2. The circuit including such an additional electric power source is costly. Consequently, these two things are disadvantages of the conventional circuit.

However, the apparatus according to the present invention is characterized by being free of these drawbacks. When the armature coil is activated, its armature current builds up slowly due to its large inductance, whereas, when the armature coil is deactivated, the magnetic energy stored in the armature coil is returned through the diodes 6c and 6d to the electric power source. In this case, the armature current trails off slowly. Accordingly, both the rotational speed and the efficiency drop respectively. These inconveniences can be removed by raising the electric power source voltage; however, if the operating condition of the motor is set to rotate at 10 thousands rpm for output of 1 Kw, the operating voltage is required to be more than 1000 volts, and thus, a practical merit of such a system will be lost. However, with the present invention, such a disadvantage can be removed.

Next, its detail is explained with reference to FIG. 21. Position detecting signal curves 36a, 36b, - - - the curves 37a, 37b, - - -, and the curves 38a, 38b, - - -of FIG. 12 are inputted from terminals 42a, 42b and 42c. In response to above-described input signals, the transistors 20a, 20b and 20c are turned on to activate the armature coils 32a, 32b and 32c. A terminal 40 is supplied with a standard voltage for designating an armature current. By changing a voltage of the terminal 40, an output torque can be changed. When an electric power switch (not shown) is turned on, an output of an operational amplifier 40b becomes a HIGH-level since an input of a negative terminal of the operational amplifier 40a is lower than that of its positive terminal. Therefore, the transistor 4a is turned on and, in turn, the voltage is supplied to the current supply control circuit for the armature coil. A resistance 22a is a resistance for detecting an armature current of the armature coils 32a, 32b, and 32c. A reference numeral 40b denotes a current amplification circuit.

Figure 25:
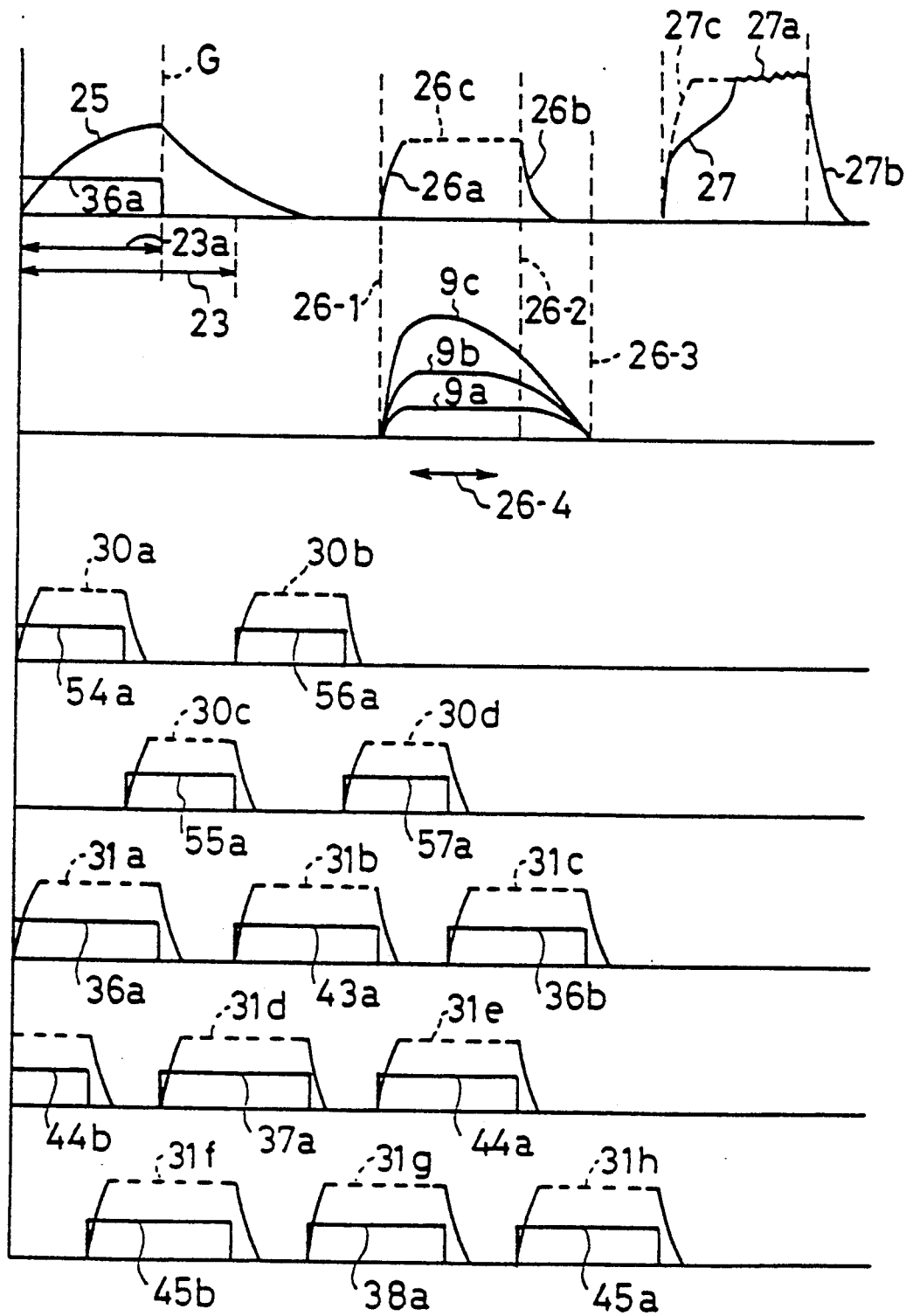
FIG. 25 is a time chart showing position detecting signals and armature currents; and, FIG. 26 is a time chart showing position detecting signals of the two-phase reluctance type motor.

One of above-described position detecting signal curves is shown as a curve 36a in a first step of a time chart of FIG. 25. The armature coil 32a is supplied with an exciting current during a time period corresponding to this curve 36a. An arrow 23a shows a current supply angle of 120 degrees.

In an initial stage of the current supply period, the building-up of the exciting current is delayed due to an inductance of the armature coil. If the current supply is stopped, magnetic energy stored in the armature coil is discharged through the diodes 6c and 6d of FIG. 16 to return to the electric power source. Therefore, the current decreases as shown by a second half portion of the curve 25, i.e., a right side of the dotted line G.

A section generating a positive torque is a 180-degree section shown by an arrow 23. Thus, a counter torque is generated, and both the output torque and the efficiency drop. This phenomenon becomes so conspicuous as the speed increases that the practical operation of the motor in a high-speed region becomes impossible.

This is because a time width of a positive torque generating section 23 decreases in proportion to an increase of the rotational speed, while a time width of a counter torque generating section will not vary even if the motor speed increases.

The same principle applies to the current supply operation of the armature coils 32b and 32c based on other position detecting signals 37a and 38a.

Since a building-up portion of the curve 25 is also delayed, the output torque decreases. That is, torque reduction is generated. This is because the magnetic pole and the salient pole interact to close the magnetic path to generate a large inductance.

Though a reluctance type motor has an advantage of being capable of generating a high output torque, but it is disadvantageous in that it lacks in the ability to increase its revolution speed due to the generation of the above-described counter torque and torque reduction.

Figure 21:
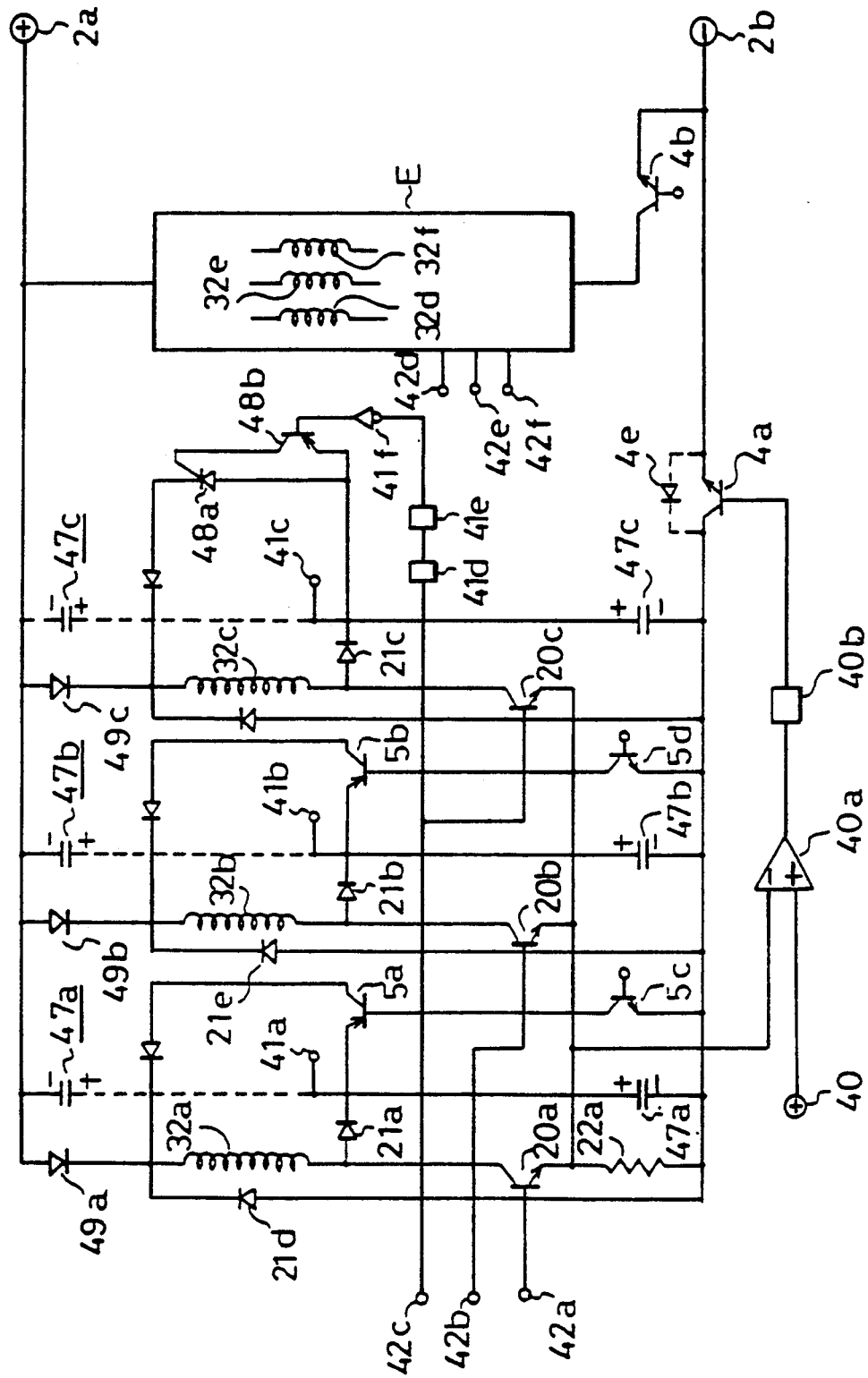
FIG. 21 is a circuit diagram showing another embodiment of the current supply control circuit for the armature coils of the three-phase full-wave current supply mode reluctance type motor.

An apparatus in accordance with the present invention is characterized in that it capable of moving the above-mentioned disadvantage by additionally providing back-flow preventing diodes 49a, 49b and 49c, small-capacitance capacitors 47a, 47b and 47c, and switching semiconductor elements (suffixed with reference numerals 5a, 5b, - - -, 48a, 48b) shown in FIG. 21, and in that only one switching element (suffixed with reference numeral 20a, or 20b, or 20c) is provided on the negative-voltage side of the electric power source for activating one armature coil.

When the current supply is stopped at the terminal end of the curve 36a, magnetic energy stored in the armature coil 32a is discharged through the diode 21a to the capacitor 47a to charge it up to a high voltage with polarities shown in the drawing, by preventing the magnetic energy from returning to the DC electric power source by a function of the back-flow preventing diode 49a. Accordingly, the magnetic energy disappears rapidly, and the current also decreases rapidly.

Curves 27, 27a and 27b shown in a first step of the time chart of FIG. 25 show a current curve flowing through the armature coil 32a. Both dotted lines on both sides of each curve are spaced by 120 degrees. The supplied current decreases steeply as shown by the curve 27b to prevent the generation of counter torque. The capacitor 47a is charged up to a high voltage and held to this value.

Then, in response to the position detecting signal 36b, the transistor 20a is turned on to activate the exciting coil 32a. At this moment, a large voltage equal to the sum of the voltage of the DC electric power source (a voltage between the terminals 2a and 2b) and the charged voltage of the capacitor 47a is applied to the exciting coil 39a.

Consequently, the exciting current in exciting coil 39a builds up rapidly as shown by the curve 27. The building-up portion of the current 27 becomes slow or moderate in its intermediate portion, since the magnetic energy is transformed into thermal energy due to copper losses of coils and iron losses of magnetic cores occurring when the magnetic energy is transferred between armature coils. A means for removing such a disadvantage will be discussed later.

As is explained above, according to the present embodiment, the torque reduction and the counter torque are suppressed, and output torque is increased, since the armature current substantially becomes the rectangular-waveform.

Input signals to a base of the transistor 5c become curves 58a, 58b, - - - of FIG. 12. Only first-halves of the curves 36a, 36b, - - - are inputted and the transistors 5a and 5c are turned on. Electric signals of curves 58a, 58b, - - - can be obtained as output signals from AND circuit, which inputs the signals of the curves 36a, 36b, - - - and the curves 44a, 44b, - - - -. A high-voltage of the capacitor 47a is applied to the armature coil 32a only in an initial stage of the current supply to the armature coil 32a by turning on the transistors 5a and 5c.

Next, a chopper circuit will be explained. When the exciting current of the armature coil 32a increases, and the voltage drop in the resistance 22a, which is for detecting the exciting current value, continues to become below the voltage of the standard voltage terminal 40 (i.e. an input voltage of the positive terminal of the operational amplifier 40a), the output of the operational amplifier 41a becomes a LOW-level to cause the transistor 4a to be turned off, and the armature current flowing through the diode 21c decreases.

Due to the hysteresis characteristics of the operational amplifier 40a, when the predetermined value is decreased, the output of the operational amplifier 40a returns to a HIGH-level to turn on the transistor 4a, thereby also causing the armature current to increase.

The armature current is maintained at a predetermined value, by repeating such a cycle.

A section indicated by the curve 27a in FIG. 25 is a section controlled by a chopper circuit. A height of the curve 27a is regulated by a voltage of the standard voltage terminal 40.

The armature coil 32b of FIG. 21 is activated by the turning on the transistor 20b in accordance with the widths of the position detecting signal curves 37a, 37b, - - -inputted from the terminal 42b, and the chopper control is carried out by the operational amplifier 40a and the resistance 22a.

Functions and effects of the diodes 49b and 21b, and the capacitor 47b are the same as those of the exciting coil 32a. The same explanation applies to the armature coil 32c. That is, the current supply control for the exciting coil 32c is executed by inputting the position detecting signal curve 38a, 38b, - - - of FIG. 12 to the terminal 42c.

Functions and effects of the transistors 20c and 4a, the operational amplifier 40a, the resistance 22a, the diode 49c and the capacitor 47c are the same as those explained in the previous case.

Input signals to the base of the transistor 5d become curves 59a, 59b, - - - of FIG. 12. In response to these input signals, the transistors 5d and 5b are turned on, and, by virtue of a high-voltage of the capacitor 47b, the armature current of the armature coil 32b builds up sharply.

Though the above-described function of the armature coil 32c can be executed by the transistor, the same effect can also be obtained by an SCR (Silicon Controlled Rectifier) 48a. As the transistor 48b is turned on in response to a turning-on of the transistor 20c, the SCR 48a is turned on concurrently with the activation of the armature coil 32c. Thus, the high-voltage of the capacitor 47c is applied to the armature coil 32c to make the armature current build up sharply.

The SCR 48a becomes a useful means in the case where the current supply needs to be done in a short period of time, since it can supply 100 times as large current as a rated value.

The SCR 48a is automatically turned off upon a discharge of the capacitor 47c.

Even if the capacitors 47a, 47b, and 47c are replaced with capacitors 47a, 47b and 47c as shown in the drawing, the same function and effect can be obtained. In such a case, the diode 4d should be connected in parallel with the transistor 4a, since the magnetic energy stored in the armature coil 32a is discharged through the diode 21a, the electric power source and the diode 21c to charge the capacitor 47a.

The current supply sections for the respective armature coils can be initiated from any point within a 30-degree section after the salient poles have begun entering into the magnetic poles. The point at which the current supply section start can be adjusted by changing the positions at which the position detecting coils 10a, 10b and 10c to function as position detection elements are to be fixed on the side of armature, in consideration of the revolving speed, efficiency and output torque.

As is apparent from the foregoing description, the motor according to this embodiment provides high-speed operation, high efficiency and a large output as a three-phase half-wave current supply type motor, and thus the object of the present invention can be accomplished with this motor. In the case of three-phase full-wave current supply mode, the same object can be accomplished by combining two sets of half-wave current supply circuits in accordance with above-described means. This means will be explained in detail later.

Next, the electric signals inputted from the terminals 41a, 41b and 41c will be explained.

Figure 20:
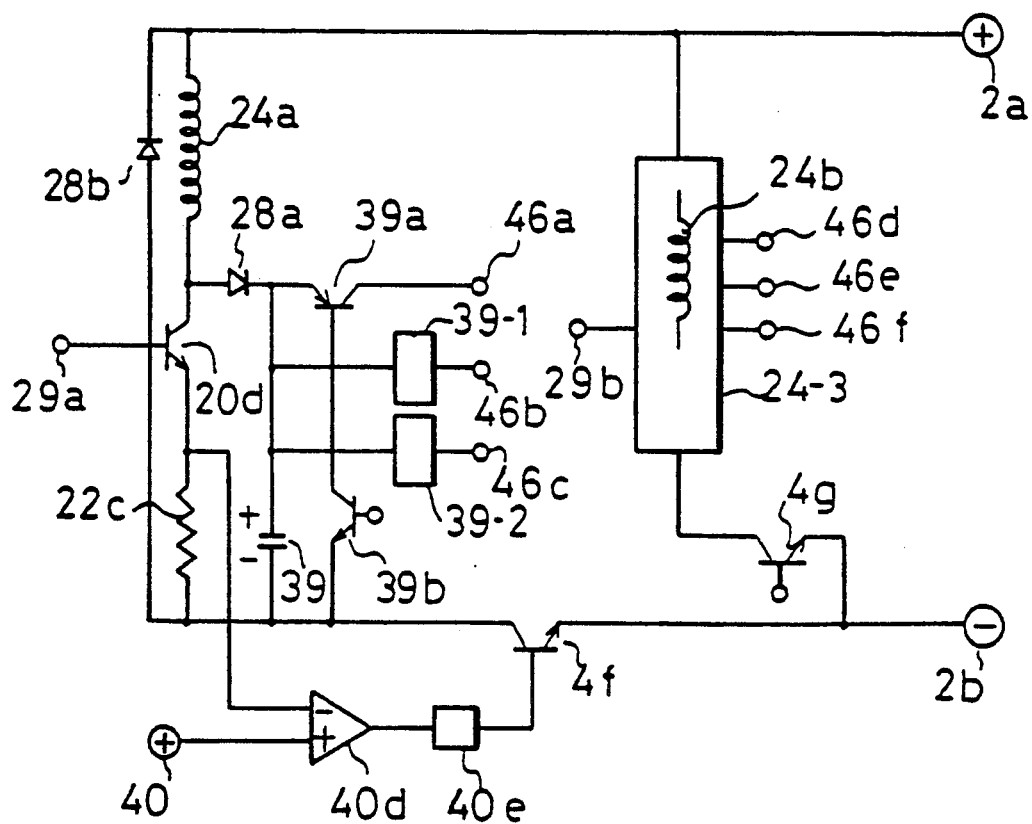
FIG. 20 is a circuit diagram showing a modification of the electric circuit of FIG. 21 modified by adding inductance coils.

In FIG. 20, the terminal 29a is supplied with the signals of the curves 58a, 58b, - - -, the curves 59a, 59b, - - -, the curves 60a, 60b, - - - through an OR circuit. Curves 59a, 59b, - - - are obtained as outputs from an AND circuit, which inputs the curves 37a, 37b, - - - and the curves 45a, 45b, - - - -. Curves 60a, 60b, - - - are obtained by the similar means.

As the transistor 20d is activated in response to the above-described electric signals, the inductance coil 24a is activated.

The inductance coil 24a is a coil wound around a closed magnetic core, and its inductance value is substantially the same as those of the armature coils 32a, 32b, - - -.

If the armature current increases, the voltage drop in the resistance 22c increases. If the value of this voltage drop becomes larger than an input value of the plus terminal of the operational amplifier 40d, i.e., the voltage of the standard voltage terminal 40, the output terminal of the operational amplifier 40d is inverted to a LOW-level. Therefore, an output of the amplification circuit 40e also becomes a LOW-level to cause the transistor 4f to be deactivated.

The magnetic energy stored in the inductance coil 24a is discharged to become a current to flow through the transistor 20d, the resistance 22c and the diode 28b, and the current decreases. When the current value is decreased down to a predetermined value, the output of the operational amplifier 40d is changed to a HIGH-level due to its hysteresis characteristics to turn on the transistor 4f. Then, the current flowing through the inductance coil 24a increases.

By repeating such a current supply operation, the function of a chopper circuit is made available to regulate the current supply in accordance with the voltage of the standard voltage terminal 40. Since an input signal from the terminal 29a is extinguished at a terminal end of the position detecting signal, the transistor 20d is turned off. Then, the magnetic energy stored in the inductance coil 24a is discharged through the diode 28a to charge the small-capacitance capacitor 39 to a high voltage.

Input signals to a base of the transistor 39b are differential pulses of terminal ends of the position detecting signal curves 36a, 36b, - - - -. Thus, when the transistors 39a and 39b are turned on, the electrostatic energy stored in the capacitor 39 is discharged into the armature coil 32a through the terminal 41a of FIG. 21, which is connected to the terminal 46a. In this instance, the electrostatic energy stored in the capacitor 47a is also discharged into the armature coil 32a. Hence, the armature current of the armature coil 32a builds up more sharply.

That is, though the building-up curve shows a delay at its intermediate portion in the previous embodiment as shown by the curve 27 in FIG. 25, the present embodiment can eliminates this delay as indicated by a dotted curve 27c. Thus, the armature current builds up immediately, and, subsequently, it becomes flat by the chopper function.

Thus, by virtue of this substantially rectangular-waveform current, the output torque can be increased, and ripple components of the output torque can be reduced as well.

Block circuits 39-1 and 39-2 of FIG. 20 are the circuits having the same functions as the transistors 39a and 39b. More particularly, these block circuits operate in such a manner that the timings for letting the electrostatic energy stored in the capacitor 39 discharge from the terminals 46b and 46c are set to the terminal ends of the position detecting signal curves 37a, 37b, - - -, the curves 38a, 38b, - - -, respectively. The terminals 46b and 46c are connected to the terminals 41b and 41c of FIG. 21, respectively, so that, the same purpose can be accomplished.

Curves 26a, 26b, and 26c illustrated in the first step of FIG. 25 show a current supply curve for the armature coil. A gap between a dotted line 26-1 and a dotted line 26-2 is a 120-degree width of the position detecting signal, while a gap between the dotted line 26-1 and a dotted line 26-3 is a 180-degree width of the output torque generating section.

Curves 9a, 9b and 9c show output torque curves. The current supply operation is initiated at the point of the dotted line 26-1, and the salient poles begin entering the magnetic poles at the same time.

The curve 9a corresponds to the case wherein small current is supplied to the armature coil, and the torque is relatively flat; however, as shown by the curves 9b and 9c, a peak value of the torque tends to shift toward a left side as the current value increases, and a width of the peak value will decrease.

Because of above-described torque characteristics and the supplied current value, it is preferable to set an initiation timing of the current supply to an intermediate point of a 30-degree section after the point poles, by adjusting the fixing points of the position detecting coils 10a, 10b and 10c.

In this embodiment, it is preferable for the capacitors 47a, 47b and 47c to be of smallest possible capacitances so that they can be charged to highest possible voltages, whereby rapid building-up and trailing-off of the current can be accomplished to obtain a high-speed reluctance type motor which is free of the common disadvantage of conventional reluctance type motors, too-low operating speed. The capacitances of the above-described capacitors are preferred to be as small as possible but to the extent not to cause the transistors of the circuit to be damaged by the charging current.

Next, an explained will be made as to an embodiment in which the present invention is applied to the three-phase full-wave type motor. FIG. 2 shows its plane view, and FIG. 4 its development; however, the same detailed explanations common to these drawings which are included in the previous description are omitted here.

A current supply control circuit for armature coils 32a, 32b and 32c of FIG. 21 corresponds to the half-wave current supply portion of the above-described three-phase full-wave current supply mode circuit. A block circuit E is a current supply control circuit for armature coils 32d, 32e and 32f, and has a constitution similar to the circuit for the armature coils 32a, 32b and 32c.

Input signals from the terminals 42d, 42e and 42f are shown as curves 45a, 45b, - - -, curves 43a, 43b, - - -, curves 44a, 44b, - - - of FIG. 12. These armature coils are activated in accordance with widths of respective curves. A base of the transistor 4b is connected to a chopper circuit similar to the circuit constituted by the operational amplifier 40a, the amplification circuit 40b and the standard voltage terminal 40 so that the armature current can be controlled to a predetermined value.

As can be understood from the foregoing explanation, the three-phase full-wave current supply mode motor according to this embodiment is characterized by that both the building-up and trailing-off of the armature current are sharpened, and thus the motor is capable of operating with high efficiency and high speed without causing any large ripple torque.

A block circuit 24-3 of FIG. 20 is a current supply control circuit for the inductance coil 24b, and has the a constitution similar to the circuit for the inductance coil 24a. Electric signals of the curves 61a, 61b, - - -, the curves 62a, 62b, - - -, the curves 63a, 63b, - - - of FIG. 12 are inputted to the terminal 29b. Output signals from the terminals 46d, 46e, and 46f are supplied to predetermined terminals of the block circuit E of FIG. 21.

A base of the transistor 4g is connected to a chopper circuit, which is similar to the circuit constituted by the operational amplifier 40d, the amplification circuit 40e and the standard voltage terminal 40, in order to have the armature current of the inductance coil 24b controlled to a predetermined value. Thus, the armature currents of the armature coils 32d, 32e and 32f can be built up or trailed off more sharply.

Next, with reference to FIG. 17, an embodiment concerning a three-phase full-wave current supply mode motor will be explained. According to FIG. 17, position detecting signal curves 36a, 36b, - - - and the curves 43a, 43b, - - - are inputted from the terminals 42a and 42d. Therefore, the armature coils 32a and 32e are activated by armature currents of 120-degree width and 180-degree phase difference.

The standard voltage terminal 40, the operational amplifier 40a, the amplification circuit 40b and the transistor 4a constitute a chopper circuit like the case of the circuit shown in FIG. 21 to hold the armature current to a predetermined value.

When the armature coil 32a is deactivated, the magnetic energy stored in the armature coil 32a is discharged through the diode 21a into a small-capacitance capacitor 47a to charge it to a high voltage.

When the rotor rotates 60 degrees, the current supply to the armature coil 32e is initiated. In this case, transistors 20b and 5b are turned on. Therefore, the high voltage charged in the capacitor 47a is applied to the armature coil 32e to rapidly build up its armature current.

When the armature coil 32e is deactivated, the magnetic energy stored in the armature coil 32e is discharged through the diode 21b into the capacitor 47a to charge it. When the current supply to the armature coil 32a is next initiated, a high voltage is applied through the transistor 5a to rapidly build up that its armature current.

When the armature coils 32a and 32e are deactivated, their armature currents are decreased steeply by the high voltage charged in the capacitor 47a. Accordingly, torque reduction and counter torque can be suppressed effectively.

The transistors 5a and 5b can be replaced by the circuit comprising the SCR 48a and the transistor 48b, which are described in FIG. 21, to obtain a practical circuit. The same object can be accomplished by replacing the capacitor 47a with the capacitor 47a. In this case, the diode 4e is necessary.

Block circuits B and C are current supply control armature coils 32c and 32d, in response to the input signals from the terminal 42b (i.e. curves 37a, 37b, - - - of FIG. 12), the terminal 42e (i.e. curves 44a, 44b, - - -), the terminal 42c (i.e. curves 38a, 38b, - - -), and the terminal 42f (i.e. curves 45a, 45b, - - -), respectively, and these block circuits have the same constitutions as the circuits for the armature coils 32a and 32e.

The chopper circuit for controlling the armature currents of the transistors 4b and 4c has the same constitution, and, accordingly, has the same function and effect.

In the time chart of FIG. 25, the curves 31a, 31b and 31c represent armature current curves of the armature coils 32a and 32e in accordance with the position detecting signal curves 36a, 36b, - - - and curves 43a, - - -. The curves 31d and 31e represent armature currents of the armature coils 32b and 32f. The curves 31f, 31g and 31f represent armature currents of the armature coils 32c and 32d.

Next, with reference to FIG. 17, an input signal from the terminal 41 will be explained. In FIG. 18, components suffixed with the same reference numerals as FIG. 20 are identical components, and, therefore, have the same functions.

Figure 17:
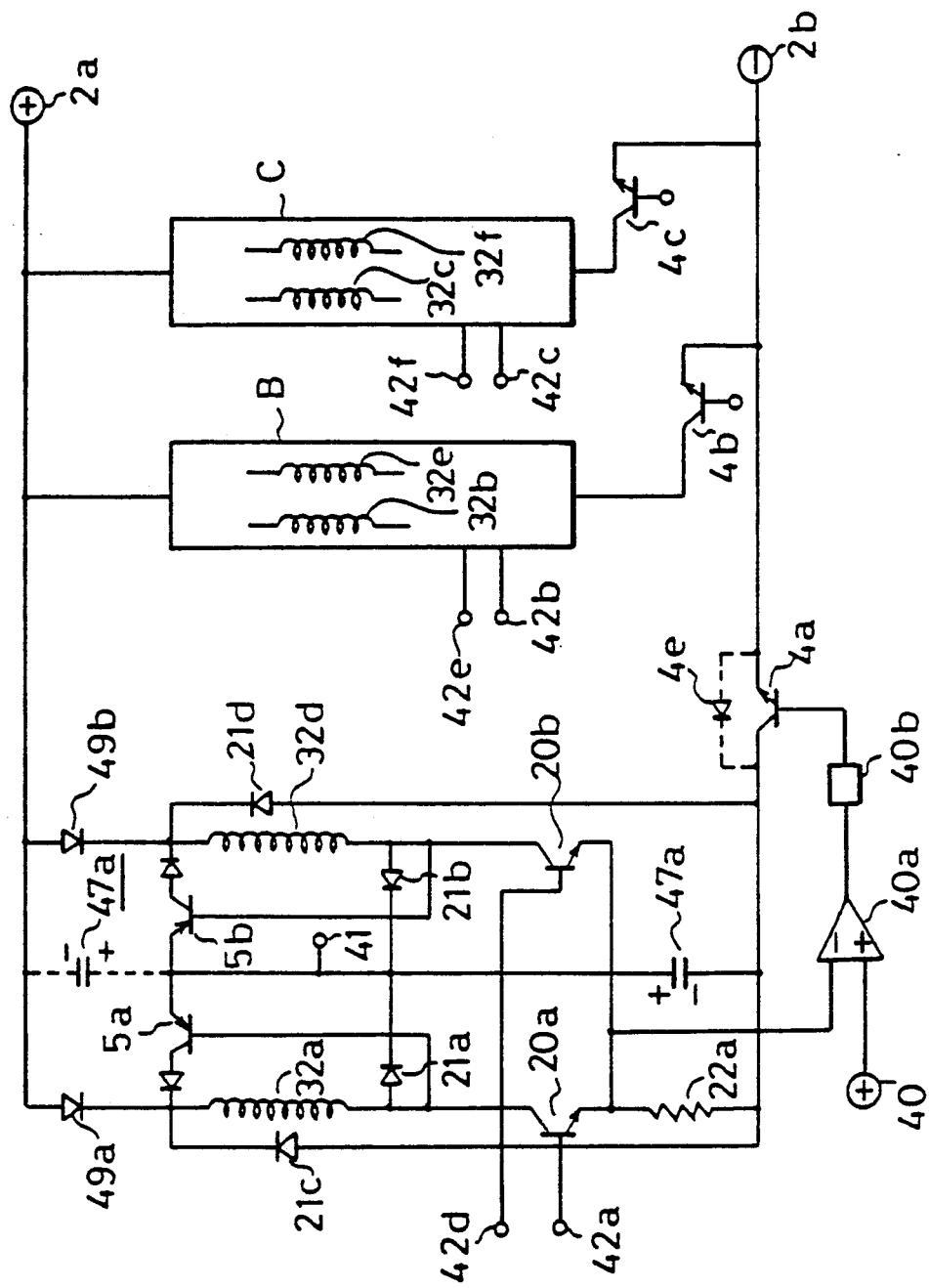
FIG. 17 is a circuit diagram showing a current supply control circuit for armature coils of a three-phase full-wave current supply mode.
Figure 18:
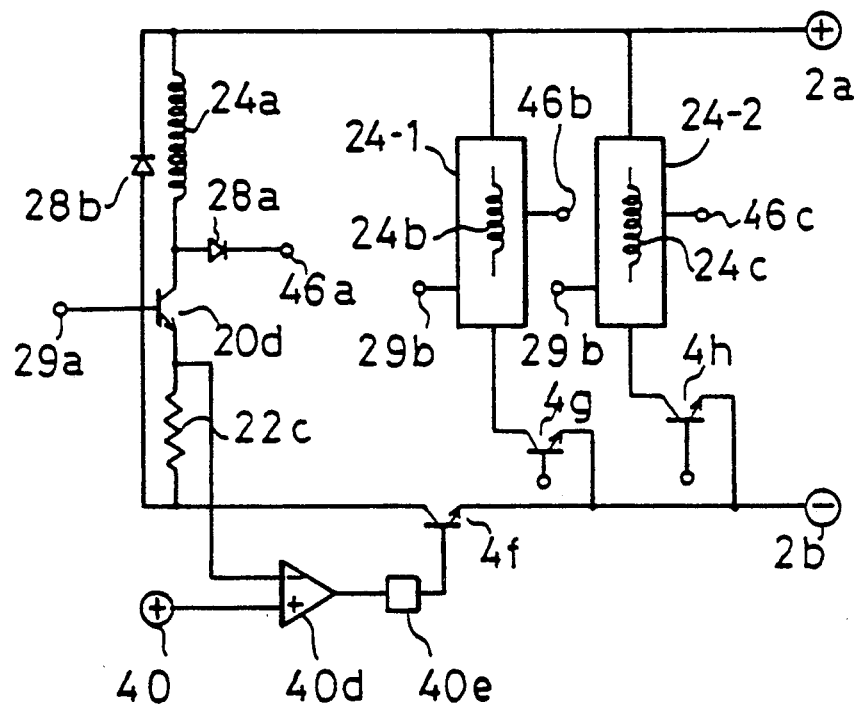
FIG. 18 is a circuit diagram showing a modification of the electric circuit of FIG. 17 modified by adding inductance coils.

The input signals of the terminals 42a and 42d of FIG. 17 are supplied to the terminal 29a through an OR circuit. Accordingly, the inductance coil 24a is supplied with currents of 120-degree width, which are spaced one another by 60 degrees.

When the armature coils 32a and 32e of FIG. 17 are deactivated, the inductance coil 24a is simultaneously deactivated. Hence, the magnetic energy stored in the inductance coil is outputted from the terminal 46a through the diode 28a. As the terminal 46a is connected to the terminal 41 of FIG. 17, the electrostatic energy in the capacitor 47a is equal to the summation of magnetic energies of the armature coil and the inductance coil. Thus, the armature current of the armature coil builds up sharply, whereby the object of the present invention can be accomplished.

Block circuits 24-1 and 24-2 are current supply control circuits for the inductance coils 24b and 24c, and have the same constitution as the current supply control circuit for the inductance coil 24a. Transistors 4g and 4h correspond to the transistors 4f, and are respectively connected to the chopper circuit so that the armature current can be held to a predetermined value.

The input signals of the terminals 42b and 42e of FIG. 17 are supplied to the terminal 29b, whereas the input signals of the terminals 42c and 42f of FIG. 17 are supplied to the terminal 29c.

Output signals from the terminals 46b and 46c correspond to the output signal from the terminal 46a. These terminals 46b and 46c are connected to the block circuits B and C of FIG. 17 so that small-capacitance capacitors included in these block circuits are charged by these output signals. Therefore, the armature current of the armature coil can be built up sharply.

Next, with reference to FIG. 19, an explanation will be made as to an embodiment of a current supply control circuit used in a three-phase half-wave current supply mode in accordance with the present invention.

Position detecting signals from the terminals 42a, 42b and 42c are represented by the curves 36a, 36b, - - -, the curves 37a, 37b, - - -, the curves 38a, 38b, - - - of FIG. 12. The armature coils 32a, 32b and 32c are successively and continuously activated by width of 120 degrees.

The transistor 4a, the operational amplifier 40a, the amplification circuit 40b, the resistance 22a, and the standard voltage terminal 40 are the same components as those suffixed with the same reference numerals in the previous embodiment, and constitute the chopper circuit for holding the armature current to a predetermined value.

When the armature coil 32a is deactivated in response to an input signal from the terminal 42a, the magnetic energy stored in the armature coil 32a is discharged through the diode 21a into a small-capacitance capacitor 47a to charge it up to a high voltage with polarities shown in the drawing.

In this case, the transistor 5a is held in a turning-off condition. When the rotor rotates 240 degrees, the transistor 20c is turned on in response to an input signal from the terminal 42c to activate the armature coil 32c. In this instance, the transistor 5a is simultaneously turned on. Therefore, the high voltage of the capacitor 47a is applied to the armature coil 32c to rapidly build up the armature current.

The smaller the capacitance of the capacitor 47a the faster the building-up of the armature current. The capacitances of the capacitors, however, should be determined depending on the withstanding voltages of other semiconductor elements compared with the level of the charging voltage.

When the armature coil 32c is deactivated, the magnetic energy stored in the armature coil 32c is discharged through the diode 21c into the capacitor 47c to charge it up to a high voltage.

When the rotor rotates 240 degrees, the transistor 20b is turned on in response to an input signal from the terminal 42b to activate the armature coil 32b. In this instance, the transistor 5c is simultaneously turned on. Therefore, the high voltage of the capacitor 47c is applied to the armature coil 32b to rapidly build up the armature current.

When the armature coil 32b is deactivated, the capacitor 47b is charged up to a high voltage. When the rotor rotates 240 degrees, the transistor 20a is turned on in response to an input signal from the terminal 42a. In this case, the transistor 5b is also turned on, so that the armature current of the armature coil 32a builds up sharply.

When respective armature coils are deactivated, the magnetic energies stored in respective armature coils are discharged into corresponding small-capacitance capacitors to charge them up to high voltages, thereby causing their armature currents to trail off quickly. As can be understood from the foregoing description, according to this embodiment, torque reduction and counter torque can be suppressed, and so a motor capable of operating efficiently and at a high-speed can be obtained. Furthermore, since the only one expensive power element is provided on the side of a negative terminal of each armature coil, the cost of the circuit can be reduced. Thus, the object of the present invention can be accomplished.

The same function can be obtained even if the capacitors 47a, 47b and 47c are replaced with the capacitors 47a, 47b and 47c. In the same manner as the previously described embodiment, the diodes 49a, 49b and 49c are provided to prevent currents from flowing toward the electric power source due to the high voltage of the capacitors 47a, 47b and 47c.

In case of a three-phase full-wave current supply mode, a block circuit D is added. The block circuit D has the same constitution as the previously described circuit for controlling the current supply to the armature coils 32d, 32e and 32f. The terminals 42d, 42e and 42f are supplied with electric signals of the position detecting signal curves 43a, 43b, - - - and curves of two rows below the curves 43a, 43b, - - - of FIG. 12, respectively. Respective armature coils are activated by an amount of 120 degrees.

A base of the transistor 4b is connected to the chopper circuit including the operational amplifier 40a to hold the armature current to a predetermined value. With above constitution, it is possible to obtain a three-phase full-wave current supply mode reluctance type motor which can accomplish the object of the present invention.

In order to further sharpen the building-up of the armature current of the armature coil, a circuit shown in FIG. 20 is used. Since the function of the circuit shown in FIG. 20 is as already described, its explanation is omitted here.

Figure 19:
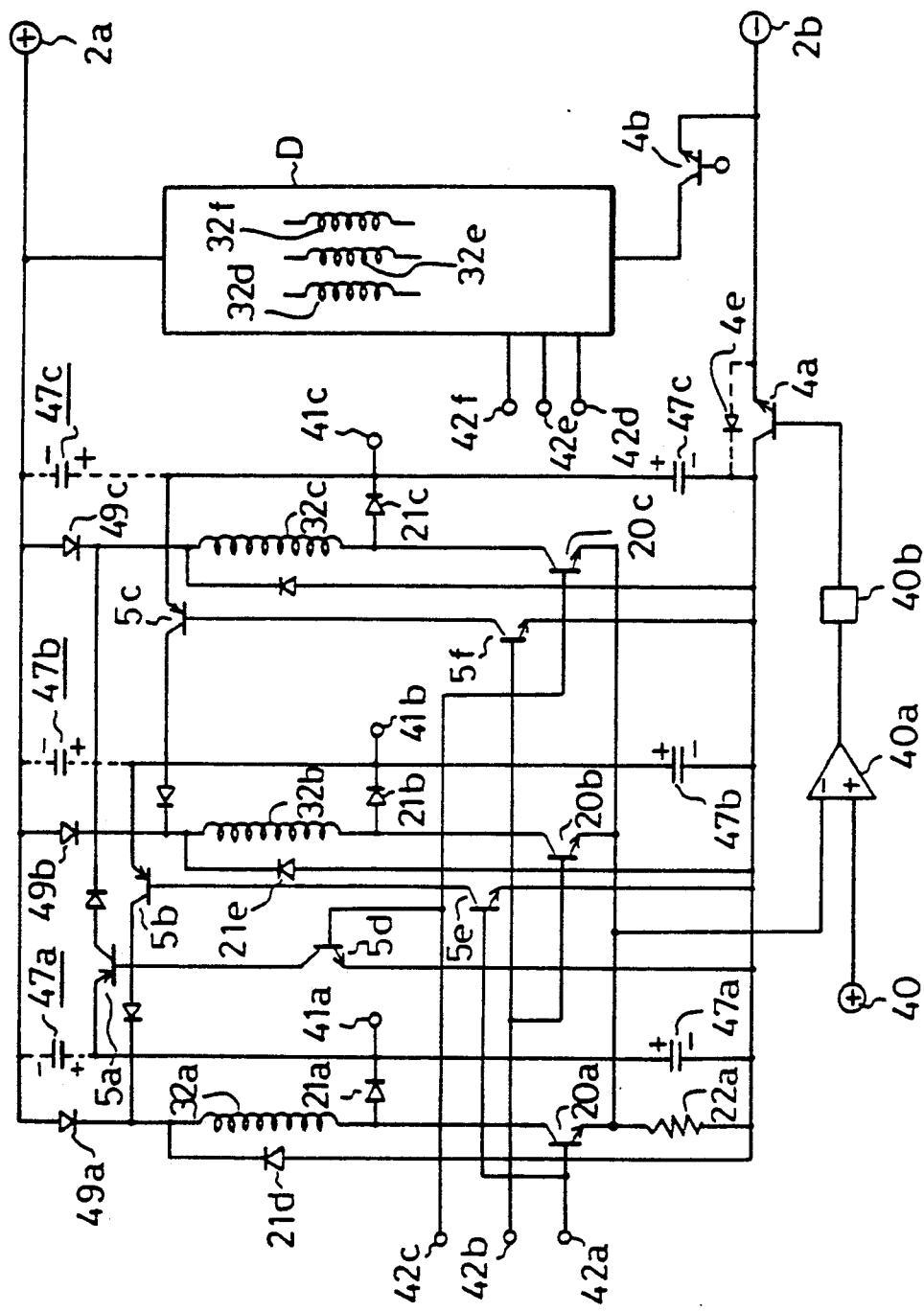
FIG. 19 is a circuit diagram showing another embodiment of the current supply control circuit for the armature coils of the three-phase full-wave current supply mode.

Terminals 46a, 46b and 46c of FIG. 20 are connected to the terminals 41a, 41b and 41c of FIG. 19, respectively. By virtue of high voltage of the capacitor 39, the armature current builds up sharply. In the case of a three-phase full-wave current supply mode, outputs from terminals 46d, 46e and 46f of FIG. 20 are inputted to corresponding terminals of the block circuit D of FIG. 19.

Figure 13:
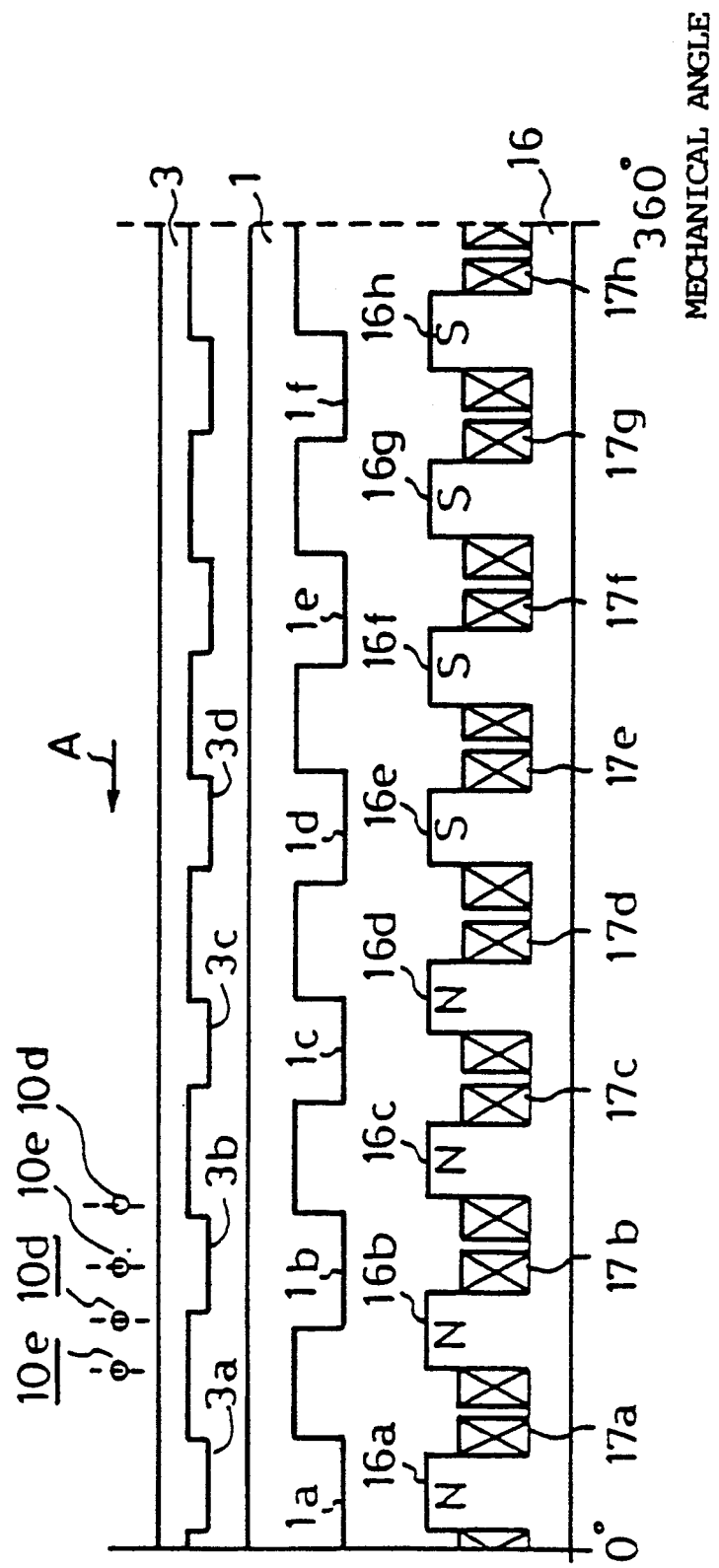
FIG. 13 is a development showing an armature and a rotor of a two-phase full-wave reluctance type motor.

A technique of the present invention can be applied to a two-phase full-wave type motor. Its detail will be explained hereinafter. Though there is not shown a plane view of this embodiment, FIG. 13 shows its development. In FIG. 13, a circular ring portion 16 and magnetic poles 16a, 16b, - - - are made of a conventional laminated silicon steel sheets and fixed on an outer casing (not shown) to form an armature. The circular ring portion 16 forms a magnetic core to provide a magnetic path. Magnetic poles 16a, 16b, - - - are wound round with armature coils 17a, 17b, - - - . The rotor 1 has an outer peripheral portion provided with salient poles 1a, 1b, - - - . These salient poles 1a, 1b, - - - - face with the magnetic poles 16a, 16b, - - -through an air gap of approximately 0.1–0.2 mm.

The rotor 1 is made by the same means as the armature 16. The rotor 1 comprises 6 salient poles uniformly spaced with each other. Tip ends of the magnetic poles 16a, 16b, - - - have 120-degree width, and 8 magnetic poles are uniformly pitched.

When the armature coils 17b and 17f are activated, the salient poles 1b and 1e are magnetically attracted to rotate the rotor 1 in a direction of an arrow A. When the rotor 1 rotates 90 degrees, the armature coils 17b and 17f are deactivated, whereas the armature coils 17c and 17g are activated to magnetically attract the salient poles 1c and 1f. Thus, the torque is generated. The magnetic poles 16b and 16c are magnetized to have an N-polarity respectively, whereas magnetic poles 16f and 16g are magnetized to have an S-polarity respectively.

Such polarization is required to prevent the flux. In a subsequent 90-degree rotation, the magnetic poles 16d and 16h are magnetized to be the N-pole and S-pole, respectively, as shown in the drawing. Further, every time the rotor 1 rotates 90 degrees, respective magnetic poles will be magnetized in sequence to the polarities as shown in the drawing.

By the above-described magnetization, the rotor 1 rotates in a direction of the arrow A to operate as a two-phase full-wave type motor. By the way, the rotor 1 can rotates in the same way even if the width of current supply section exceeds 90 degrees. Since the width of the magnetic pole around which the armature coil is wound is 120 degrees, a larger space is required for the installation of coils.

Figure 22:
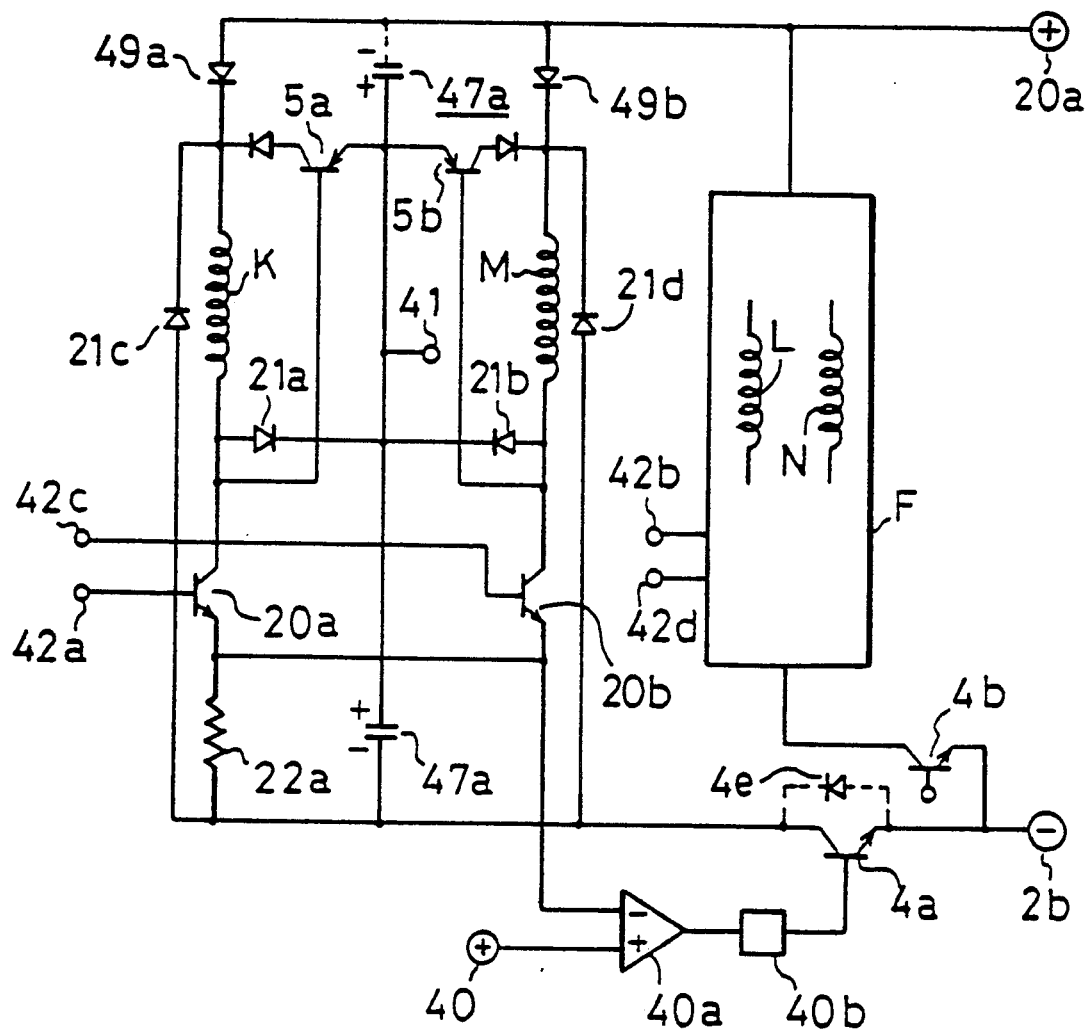
FIG. 22 is a circuit diagram showing a current supply control circuit for the armature coils of the two-phase full-wave current supply mode reluctance type motor.

Next, with reference to FIG. 22, the current supply to the armature coil will be explained. In FIG. 22, armature coils K and M denote armature coils 17a, 17e and 17c and 17g of FIG. 13, respectively. The two armature coils are connected in series or in parallel. Downside ends of the armature coils K and M are connected to the transistors 20a and 20b respectively. These transistors 20a and 20b function as semiconductor switching elements and can be replaced by other semiconductor elements having the same effect. Electric power is supplied from the positive and negative terminals 2a, 2b of the DC electric power source.

If the HIGH-level position detecting signal is inputted from the input terminal 42a, the transistor 20a is turned on to activate the armature coil K. Furthermore, if the HIGH-level position detecting signal is inputted from the input terminal 42c, the transistor 20b is turned on to activate the armature coil M.

Figure 14:
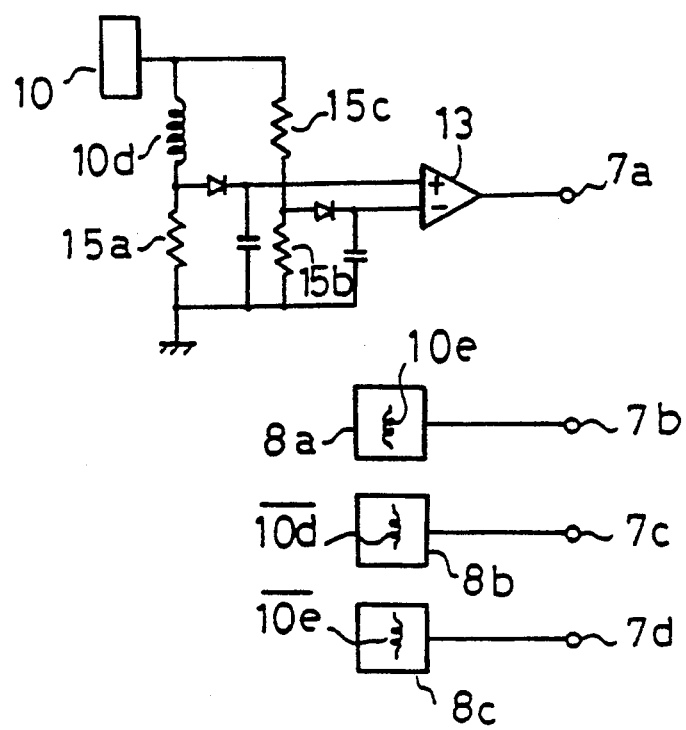
FIG. 14 is a circuit diagram showing an electric circuit of a two-phase position detecting device.

The rotor 3 of FIG. 13 is made of a conductive material, and is installed coaxially with the rotor 1 so as to rotate synchronously. The rotor 3 is provided with protruding portions 3a, 3b, - - - . The width of the protruding portion is 90–150 degrees. The coils 10d, 10e, 10d and 10e are constituted in the same manner as the previously described coils 10a, 10b and 10c. The coils 10d, 10e, 10d and 10e are disposed to face the protruding portions 3a, 3b, - - - . The coils 10d and 10e are spaced by 90 degrees, and coils 10d and 10e are offset from the coils 10d and 10e by 180 degrees, respectively. FIG. 14 shows an electric circuit for obtaining position detecting signals from above-described coils. The oscillator 10, the coil 10d, the resistances 15a, 15b, - - -, the operational amplifier 13 and so on are the same components as those shown and suffixed with the same reference numerals in FIG. 15.

Accordingly, rectangular-waveform electric signals having the same width and phase difference as the 120-degree protruding portions 3a, 3b, - - - can be obtained from the terminal 7a.

Figure 26:
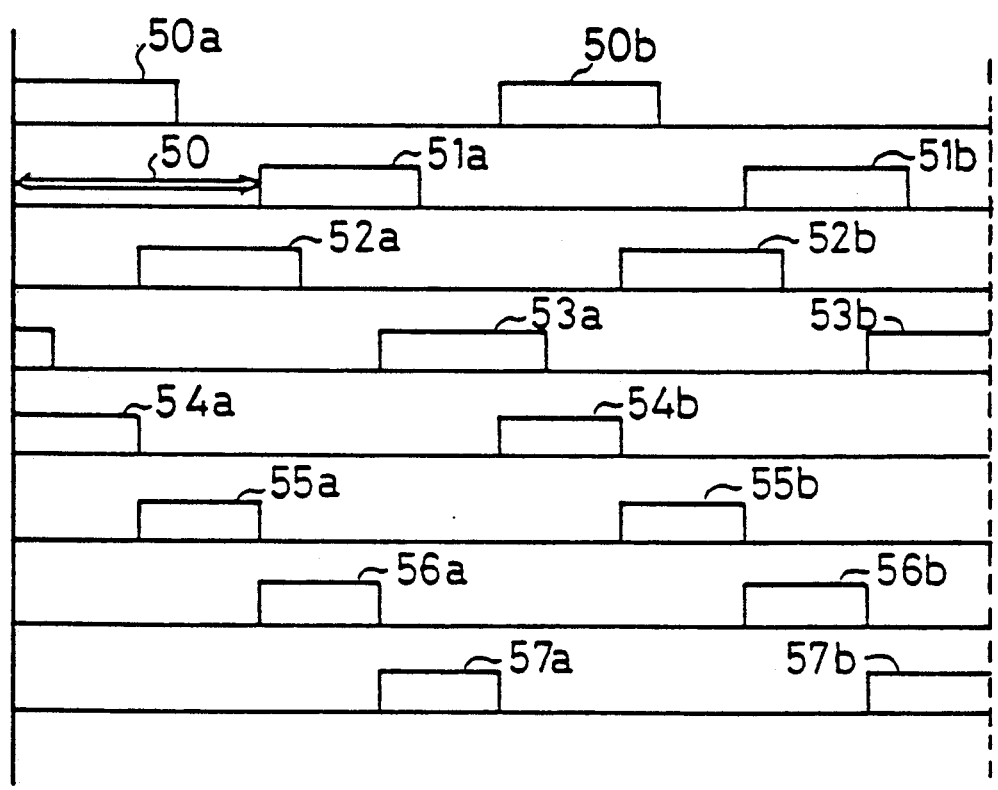

The position detecting signals obtained from the coil 10d are shown as curves 50a, 50b, - - - in the time chart of FIG. 26. Position detecting signals can be obtained from terminal 7b of block circuit 8a including coil 10e, terminal 7c of block circuit 8b including coil 10d and terminal 7d of block circuit 8c including coil 10e, which are the block circuits of the same constitution.

Output signals from the terminal 7b are shown as curves 52a, 52b, - - - in FIG. 26. Output signals from the terminals 7c and 7d are shown as curves 51a, 51b, - - -, and curves 53a, 53b, - - - , respectively. Respective curves have a 120-degree width, and are successively offset by 90 degrees.

If the width of the protruding portions 3a, 3b, - - - of FIG. 13 is changed to 90 degrees, the position detecting signals obtained from the coils 10d, 10e, 10d and 10e can be shown as curves 54a, 54b, - - -, curves 55a, 55b, - - - , curves 56a, 56b, - - - and curves 57a, 57b, - - - in the time chart of FIG. 26. Respective curves have a 90-degree width, and their phases are successively offset by 90 degrees. An arrow 50 denotes a 180-degree section.

No.1 and No.1 position detecting signals of No.1-phase are inputted from terminals 42a and 42c of FIG. 22, and are shown by curves 50a, 50b, - - - and curves 51a, 51b, - - - . No.2 and No.2 position detecting signals of No.2-phase are inputted from terminals 42b and 42b, and are shown by curves 51a, 51b, - - - and curves 53a, 53b, - - - , respectively.

Since the No.1 and No.1 position detecting signals are inputted into the terminals 42a and 42c, the current supply control of respective transistors can be executed. The No.1-phase armature coils K and M are supplied with 120-degree width currents in response to respective position detecting signals.

In response to the position detecting signal 50a, the armature coil K is supplied with a current shown by the curve 27a in the first step of FIG. 25. A width between dotted lines is 120 degrees. A torque generating condition and its characteristics are the same as the previously described embodiment of FIG. 17. A chopper function by the operational amplifier 40a, the voltage of the standard voltage terminal 40, the resistance 22a, and the transistor 4a is carried out in the same manner as the previous embodiment to regulate the current at a predetermined value.

The functions and effects of the diode 49a, the capacitor 47a, and the transistors 5a and 5b are the same as those of the previous embodiment, and, therefore, both the building-up of the curve 27 and the trailing-off of the curve 27b become steep.

A block circuit F for controlling the activation of the armature coils L and N has the same constitution as the current supply circuit for the armature coils K and M. A base of the transistor 4b is controlled by the circuit similar to the circuit constituted by the operational amplifier 40a, the amplification circuit 40b, and the standard voltage terminal 40 to hold the armature current to a predetermined value. The same function and effect can be obtained even if the capacitor 47a is replaced with a capacitor 47a.

In this case, it is necessary to provide a diode 4d. The transistor 4b is also provided with a diode.

The armature coil L is activated in accordance with widths of the curves 52a, 52b, - - - of FIG. 26, and the armature coil N is activated in accordance with widths of the curves 53a, 53b, - - - . Building-up and trailing-off of their armature currents become steep. As is explained in the foregoing, according to this embodiment, a two-phase full-wave current supply mode reluctance type motor can be obtained to accomplish an object of the present invention.

Current supplies of 90-degree width can be obtained by inputting electric signals represented by curves 54a, 54b - - -, and curves 56a, 56b - - - to terminals 42a and 42c, as well as by inputting the electric signals represented by curves 56a, 56b - - - , and curves 57a, 57b, - - - to the terminals 42b and 42d. The waveforms of these signals are as shown in FIG. 26.

In the case where the current supply width is set to 90 degrees, the motor can be operated at a high speed (100 thousands rpm with 1 kw output), though the motor output torque drops, whereas, in the case of 120-degree current supply width, the motor output torque can be increased, though the motor speed drops to a half of the speed obtained in the case of 90-degree width.

In the embodiment shown in FIG. 13, it is possible to form the magnetic poles of a 180-degree width, as well as to form 10 salient poles. Furthermore, it is also possible to form the 8 n (n: a positive integer) pieces of magnetic pole having a 120-degree width, with the number of the salient poles increased correspondingly. Increase in the number of magnetic pole entails the increase of the output torque, though the rotational speed drops.

Curves 30a, 30b, --- shown in a third step of FIG. 25 represent armature currents supplied to the armature coils K and M, while curves 30c and 30d represent armature currents supplied to the armature coils L and S. Curves 54a, 55a, 56a and 57a are position detecting signal curves. Their current widths are 120 degrees and continuous with each other. Since there is no overlapped portion between respective currents, the ripple torque can be suppressed to a small value.

In respective embodiments, the output torque can be increased by providing teeth on the magnetic poles and salient poles. Since the motor according to the present invention is primarily designed for high-speed operation, even only the ability to increase the output torque can be utilized as a useful technique deriving from the present invention.

According to an embodiment shown in FIG. 1, the invention can be realized even where the magnetic poles are provided in 2 n (n: a positive integer not less than 3) pieces. The salient poles are to be increased in accordingly. It is advantageous for the present invention that the output torque can be increased without decreasing rotational speed. Thus, the technique deriving from the present invention is useful for application to a large-diameter motor.

The SCR 48a explained with reference to FIG. 21 can be used instead of the transistors 5a and 5b shown in FIG. 22. Further, the present invention can also be realized by providing a current supply control circuit, in which each of the back-flow preventing diodes 49a, 49b ---, and each of capacitors 47a, 47b --- are connected to each of the armature coils so that the armature coils can be controlled independently.

In order to further speed the building-up of the armature current of the armature coil, the previously described circuit of FIG. 18 is used. The input signals of the terminals 42a, 42c shown in FIG. 22 are used as input signals to the and terminal 29a, whereas the input signals of the terminals 42b and 42d shown in FIG. 22 are used as input signals to the terminal 29b. Terminals 46a and 46b of FIG. 18 are connected to the terminal 41 of FIG. 22 and a corresponding terminal of the block circuit F, respectively. In this case, the block circuit 24-2 is removed.

During current supply to the armature coil K, the inductance coil 24a is also activated. When both coils K and 24a are deactivated, the magnetic energies stored in the coils K and 24a are discharged to charge the capacitor 47a to a high voltage. Accordingly, the armature current decreases rapidly.

When the armature coil M is activated, a building-up of the armature current becomes sharp. This is because the magnetic energy in the inductance coil compensates the copper losses of the armature coils and iron losses of the magnetic cores.

The above-described principle also applies to the inductance coil 24b and the armature coils L and S. Since the magnetic energies stored in the inductance coils 24a and 24b are utilized to compensate the copper losses and the iron losses, the armature current is required to have a value that is large enough only for the compensation. For the current supply, the chopper circuit can be replaced with other means. For example, if a device capable of applying a voltage reversely proportional to the rotational speed is adopted, the same effect can be obtained. Further, the same effect can be obtained even when the current width is smaller than that of the position detecting signal.

Next explained is an embodiment of the present invention applied to a conventional DC brushless three-phase motor having a magnet rotor.

Figure 23:
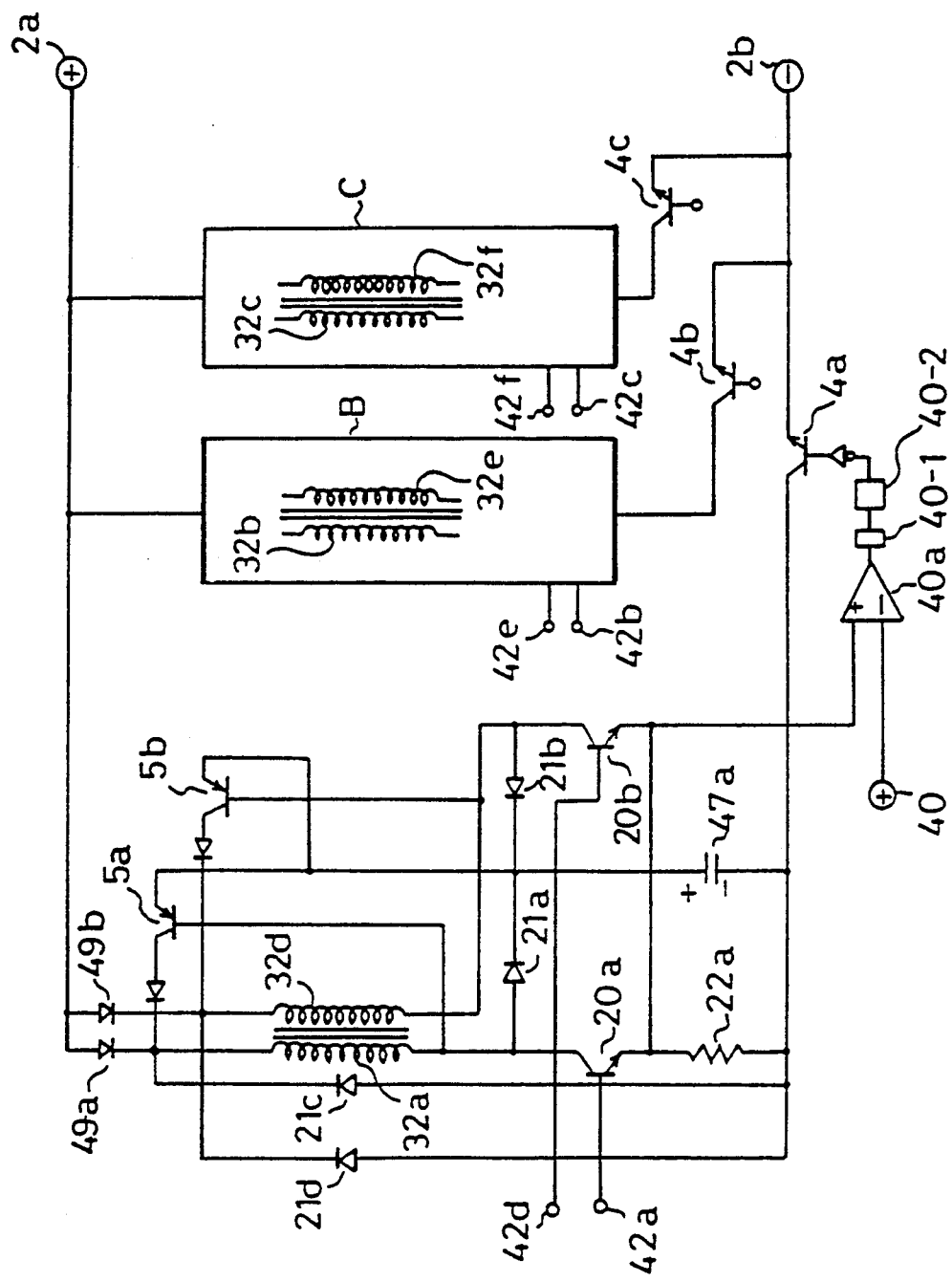
FIG. 23 is a circuit diagram showing a current supply control circuit for the armature coils of the three-phase DC motor having a magnet rotor.

In FIG. 23, armature coils 32a and 32e are armature coils wound around No.1-phase magnetic poles by the bifilar winding. These coils 32a and 32e constitute one armature coil that the reciprocative current supply can be obtained. That is, when the armature coil 32a is activated, the magnetic pole is magnetized to become an N-pole, whereas, when the armature coil 32e is activated, the same is magnetized to become an S-pole.

Above-described principle also applies to the No.2-phase armature coils 32b and 32f, and the No.3-phase armature coils 32c and 32d.

Terminals 42a and 42d are supplied with the position detecting signals of curves 36a, 36b, --- and curves 34a, 34b, --- of FIG. 12. As the constitution of this circuit is the same as the circuit of FIG. 17, its function and effect are similar too. Block circuits B and C are circuits for controlling the activation of armature coils 32b and 32f, and armature coils 32c and 32d, respectively, and have the same constitutions as above-described circuits.

Terminals 42b and 42e are supplied with electric signals of the curves 37a, 37b, ---, the curves 44a, 44b, ---, whereas terminals 42c and 42f are supplied with electric signals of the curves 38a, 38b, ---, the curves 45a, 45b, ---, which are shown in FIG. 12.

With this constitution, as well as the case of FIG. 17, no torque reduction and no counter torque are generated in a high-speed region, and, therefore, a high-speed motor having good efficiency is obtained. Furthermore, this embodiment is characterized by that the number of expensive power elements can be reduced to a half of the conventional case, i.e. three sets of transistor bridge circuits.

Instead of above-described means, the same effect can be accomplished by the control circuit means previously described with reference to FIGS. 19 and 21.

A means for holding the armature current at a predetermined value is not always necessary. However, a means of this embodiment is different from that of the previous embodiment. Next, this means will be explained.

When the armature current of the armature coils 32a and 32e exceeds a predetermined value, the voltage of the resistance 22a drops below the voltage of the standard voltage terminal 40, and an output of the operational amplifier 40a is turned to a HIGH-level. This output is transformed into a pulse signal through a differential circuit 40-1, and is further formed into a constant-width pulse signal through a monostable circuit 40-2, so that the transistor 4a is deactivated in response to this constant-width pulse signal. As the magnetic energy stored in the armature coils is discharged through the diode 21c or the diode 21d, armature currents of the armature coils are gradually decreased.

If the output of the monostable circuit 40-2 is turned to a LOW-level, the transistor 4a is again turned on to increases the armature current. When the armature current increases up to a predetermined value, the transistor 4a is deactivated during a predetermined period of time. Repeating such a cycle, the circuit functions as a chopper circuit. Since the transistors 4b and 4c are connected to similar chopper circuits, armature currents of respective armature coils are respectively held at a predetermined value.

Next, with reference to FIG. 24, an embodiment which applies the means of the present invention to a four-phase stepping motor will be explained. FIG. 3 shows a three-phase type. By using a constitution of FIG. 4 and selecting a width of 180 degrees for magnetic poles 16a, 16b, - - - a six-phase stepping motor can be obtained. Both are reluctance type. This embodiment is concerned with four-phase type, and its constitution is shown in FIG. 13.

Figure 24:
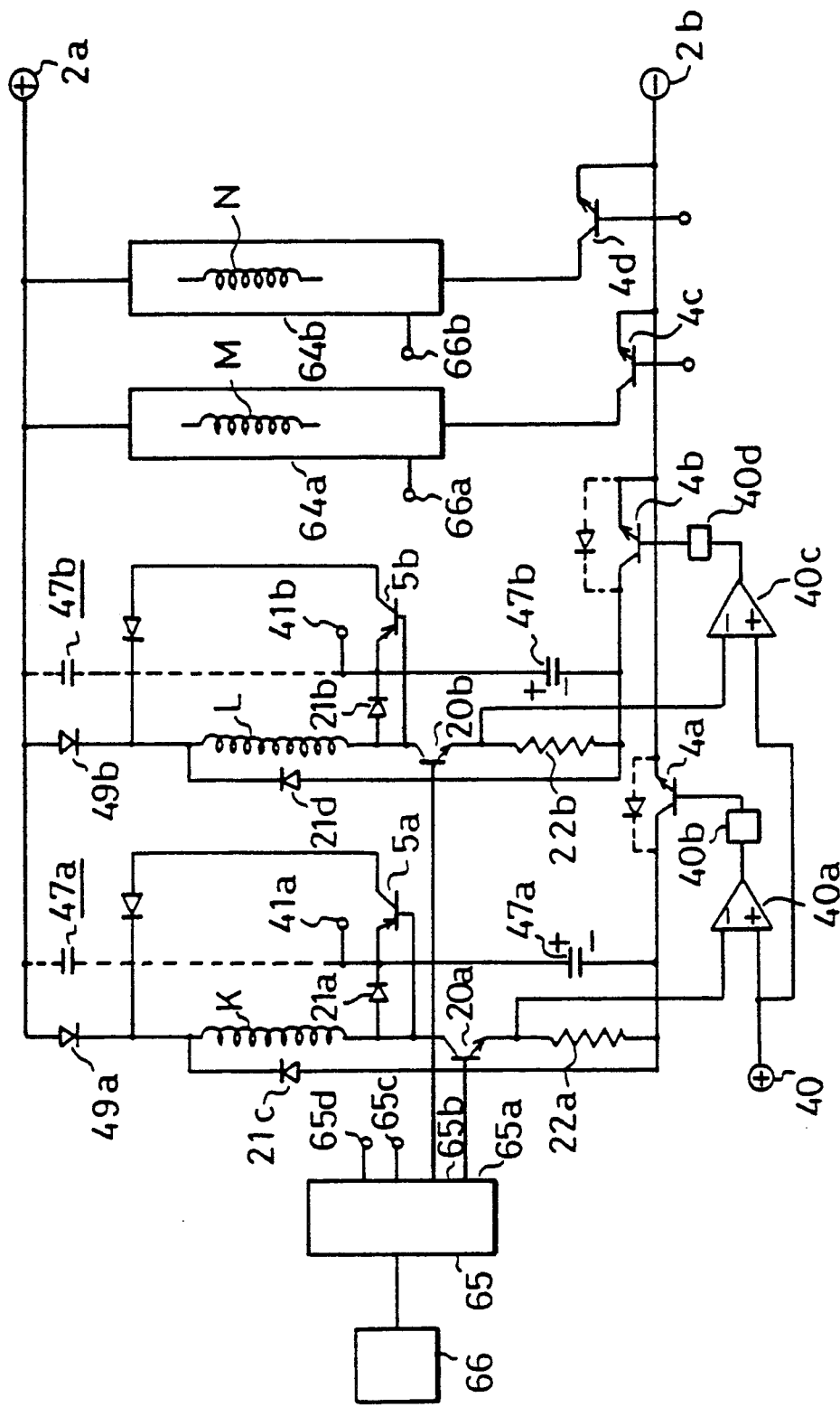
FIG. 24 is a circuit diagram showing a current supply control circuit for the armature coils of the stepping motor.

In FIG. 24, output pulses of predetermined frequency generated from a clock pulse oscillator 66 are inputted to a known pulse distributer 65. Four-phase stepping electric signals are outputted from the terminals 65a, 65b, - -.

Output signals from the terminal 65a constitute a pulses spaced one another by the width of the pulse. Output pulses from the terminals 65b, 65c and 65d constitute the same pulse row as the output pulse row of the terminal 65a. That is, the output pulses have the same rectangular-waveform and are successively offset one another by the same phase difference of 90 degrees. A constitution of the four-phase reluctance type stepping motor is shown as a development view in FIG. 13. The rotor 3 and the position detecting coils 10a, 10b, - - - are removed.

When previously described armature coils K, L, M and N are activated in accordance with these four-phase stepping electric signals by the signal width, a motor can be operated as a four-phase stepping motor.

In FIG. 24, the armature coil K is activated during a time period through which the transistor 20a is kept turned on. A current supply control for the armature coil K in accordance with this embodiment is the same as the current supply control for the coil 32a in the previous circuit shown in FIG. 21.

The only difference is that the transistor 5c of FIG. 21 is replaced with a transistor 20a having the same function. Thus, its function and effect are similar. A rectangular-waveform current similar to the rectangular wave-form electric signal inputted to the base of the transistor 20a is supplied to the armature coil.

The transistor 4a, the operational amplifier 40a, the amplification circuit 40b and the standard voltage terminal 40 function in the same manner as the components suffixed with the same reference numerals in FIG. 13, so that the armature current can be held to a predetermined value. A current supply operation of the armature coil L is similar that of the armature coil 32b of FIG. 21, and, therefore, the same function and effect can be obtained. The transistor 5d is removed, but the transistor 20b is substituted.

The operational amplifier 40c, the amplification circuit 40d, the transistor 4b and the resistance 22b constitute a chopper circuit, which regulates an armature current of the armature coil L to a predetermined value, which is regulated by the voltage of the standard voltage terminal 40.

The same effect can be obtained even when the capacitors 47a and 47b are replaced with the capacitors 47a and 47b. In this case, diodes have to be connected in parallel with the transistors 4a and 5b.

Block circuits 64a and 64b are electric circuits for activating the armature coils M and N, respectively. The terminals 66a and 66b are connected to the terminals 65c and 65d, respectively. In response to stepping electric signals, the armature coils M and N are activated by amounts corresponding to widths of these electric signals substantially rectangular-waveform.

The transistors 4c and 4d are constitute chopper circuits similar to the previously explained chopper circuit including operational amplifier 40a. Thus, armature currents of the armature coils M and N can respectively be controlled to a predetermined value.

As can be understood from the foregoing explanation, a motor according to this embodiment is operated as a four-phase stepping motor. In this case, armature current of the armature coil builds up and down quickly. Thus, both the fall of the output of the motor in a high-speed region and the occurrence of disorder can be prevented.

Furthermore, the cost can be reduced, since the activation of each armature coil can be controlled by only a single power element.

It is possible to utilize the SCR 48a explained in FIG. 21 instead of the transistors 5a, 5b. Moreover, by utilizing the circuit of FIG. 18, the stepping speed can further be increased. The chopper circuit for holding the armature current to a predetermined value is not always necessary. For example, the chopper circuit can be removed in the case where the electric power source is a low-voltage power source such as a battery power source, and a constant speed control is not required.

INDUSTRIAL APPLICABILITY

The present invention can be utilized for increasing the operating speed, as well as for preventing the fall of output torque of conventional brushless motor and reluctance type motor. Furthermore, the present invention can be applied to the high-speed stepping motor required to produce relatively large output and the conventional DC motor.

What is claimed is:

1. A high-speed three-phase half-wave current supply mode reluctance type motor including a fixed armature and a magnetic rotor, characterized by comprising:

a plurality of salient poles with the same widths, disposed on an outer surface of the magnetic rotor and mutually spaced at regular intervals of the same angle;

6n pieces (n: a positive integer) of magnetic pole protruding from an inner peripheral surface of the fixed armature to face said salient poles through slight gaps, said magnetic poles, disposed at regular intervals and having the same circumferential width of 120 degrees or 180 degrees by electrical angle, to be wound by an associated armature coil, each pair of which are symmetrically disposed and have the same phase;

No.1-, No.2- and No.3-phase armature coils associated with said magnetic poles;

a position detecting device including a plurality of position detecting elements for detecting rotational positions of said salient poles and generating rectangular-waveform No.1-phase position detecting signals having the same width of 120 degrees by electrical angle and a phase difference of 360 degrees by electrical angle therebetween, and rectangular-waveform No.2- and No.3-phase position detecting signals having the same width and phase difference as the No.1-phase position detecting signals but being successively delayed one another from the No.1-phase position detecting signals by an electric angle of 120 degrees;

a switching element connected to both ends of each armature coil;

first diodes inversely connected to a negative voltage terminal of a DC electric power source in parallel with serial joint units each consisting of said switching element and its corresponding armature coil, and second diodes each having one end inversely connected to a negative voltage terminal of said armature coil;

first, second and third current supply control circuits for supplying currents to said No.1-, No.2- and No.3-phase armature coils through third, fourth and fifth back-flow preventing diodes respectively connected to the DC electric power source in a forward direction, by turning on said switching elements connected to both ends of the armature coils in response to said No.1-, No.2- and No.3-phase position detecting signal;

first, second and third capacitors having small capacitances for storing magnetic energies discharged from said No.1-, No.2- and No.3-phase armature coils through said first and second diodes each having one end inversely connected to the negative voltage terminal and included in the first, second and third current supply control circuits respectively, when these armature coils are deactivated;

an electric circuit for supplying electrostatic energy charged in the first capacitor to the No.3-phase armature coil when the No.3-phase armature coil is activated, and supplying electrostatic energies charged in the third and second capacitors to the No.2-phase and No.1-phase armature coils when the No.2-phase and No.1-phase armature coils are activated respectively; and a means for fixing said position detecting elements on the side of the fixed armature so that said armature coils wound around said magnetic poles can be activated at a predetermined point within an electric angle of approximately 30 degrees beginning from a point at which said salient poles start entering said magnetic poles.

2. A high-speed motor in accordance with claim 1, further comprising an inductance coil which is supplied with current corresponding to first halves of said No.1-, No.2- and No.3-phase position detecting signals, and an electric circuit for converting magnetic energy stored in said inductance coil into electrostatic energy of said first, second and third capacitors when said inductance coil is deactivated.

3. A high-speed a three-phase full-wave current supply mode reluctance type motor including a fixed armature and a magnetic rotor, characterized by comprising:

a plurality of salient poles having the same widths, disposed on an outer surface of the magnetic rotor at regular intervals and the equal angles;

12n pieces (n: a positive integer) of magnetic pole protruding from an inner peripheral surface of the fixed armature to face said salient poles through slight gaps, said magnetic poles, disposed at regular intervals and having the same circumferential width of 120 degrees or 180 degrees by electrical angle, to be wound with an associated armature coil, each pair of which are symmetrically disposed and have the same phase;

armature coils wound around said magnetic poles;

a position detecting device including a plurality of position detecting elements for detecting rotational positions of said salient poles, as well as for generating rectangular-waveform No.1-phase position detecting signals having the equal widths by an electric angle of 120 degrees and a phase difference by an electric angle of 360 degrees therebetween, rectangular-waveform No.2- and No.3-phase position detecting signals having the same width and phase difference as the No.1-phase position detecting signals but being successively delayed from one another from the No.1-phase position detecting signals by an electric angle of 120 degrees, further a rectangular-waveform No.1-phase position detecting signals having the same width and phase difference as the No.1-phase position detecting signals but being delayed from said No.1-phase position detecting signals by an electric angle of 180 degrees, and rectangular-waveform No.2- and No.3-phase position detecting signals having the same width and phase difference as the No.1-phase position detecting signals but being successively delayed from another from the No.1-phase position detecting signals by an electric angle of 120 degrees;

a pair of armature coils to be activated with No.1-phase half-wave current, which are referred to as No.1 and No.1 armature coils, and pairs of armature coils to be activated with No.2-phase and No.3 phase half-wave currents, which are respectively referred to as No.2 and No.2 armature coils, and No.3 and No.3 armature coils;

a switching element connected to both ends of each armature coil;

first diodes inversely connected at a negative voltage terminal of a DC electric power source in parallel with serial joint units each consisting of said switching element and its corresponding armature coil, and second diodes each having one end inversely connected to a negative voltage terminal of said armature coil;

a first electric circuit for turning on the switching elements connected to both ends of said No.1-, No.2- and No.3-armature coils wound round said magnetic poles of the fixed armature in response to said No.1-, No.2- and No.3-phase position detecting signals, as well as for turning on the switching elements connected with both ends of said No.1-, No.2- and No.3-armature coils wound round other magnetic poles of the fixed armature in response to said No.1-, No.2- and No.3-phase position detecting signals, respectively;

first and second current supply control circuits for supplying currents, by turning on said switching elements, to said No.1-, No.2-, No.3-armature coils and No.1-, No.2-, No.3-armature coils through third, fourth, - - - and eighth back-flow preventing diodes, respectively connected to the DC electric power source in a forward direction;

No.1-, No.2-, No.3-, No.1-, No.2- and No.3-capacitors with small capacitances for storing magnetic energies discharged from said No.1-, No.2-, No.3-phase armature coils and said No.1-, No.2-, No.3-phase armature coils through said first and second diodes, each having one end inversely connected to the negative voltage terminal and included in the first and second current supply control circuits when said No.1-, No.2- and No.3-phase armature coils and said No.1-, No.2- and No.3-phase armature coils are deactivated, respectively;

a second electric circuit for supplying electrostatic energies charged in the No.1- and No.1-capacitors to the No.3- and No.3-phase armature coils when the No.3- and No.3-phase armature coils are activated, for supplying electrostatic energies charged in the No.3- and No.3-capacitors to the No.2- and No.2-phase armature coils when the No.2- and No.2-phase armature coils are activated, and further for supplying electrostatic energies charged in the No.2- and No.2-capacitors to the No.1- and No.1-phase armature coils when the No.1- and No.1-phase armature coils are activated; and a means for fixing said position detecting elements on the fixed armature so that said armature coils wound round said magnetic poles can be activated at a point corresponding to predetermined angle within approximately 30 degrees by electrical angle after said salient poles begin to enter said magnetic poles.

4. A high-speed motor in accordance with claim 3 further comprising a first inductance coil which is supplied with current corresponding to first halves of said No.1-, No.2- and No.3-phase position detecting signals, a second inductance coil which is supplied with current corresponding to first halves of said No.1-, No.2- and No.3-phase position detecting signals, and an electric circuit for converting magnetic energy stored in said first inductance coil into electrostatic energies of said No.1-, No.2- and No.3-capacitors when said first inductance coil is deactivated and further converting magnetic energy stored in said second inductance coil into electrostatic energies of said No.1-, No.2-, and No.3-capacitors when said second inductance coil is deactivated.

5. A high-speed three-phase full-wave current supply mode DC motor including a fixed armature and a magnet rotor, characterized by comprising:

No.1-, No.2- and No.3-phase armature coils associated with magnetic poles of the armature;

said armature coils including an armature coil referred to as a No.1-phase armature coil of No.1-phase normal-direction current supply mode, an armature coil referred to as a No.1-phase armature coil of No.1-phase reverse-direction current supply mode, armature coils being referred to as No.2- and No.3-phase armature coils of No.2-phase and No.3-phase normal-direction current supply modes, and armature coils referred to as No.2- and No.3-phase armature coils of No.2-phase and No.3-phase reverse-direction current supply modes;

a position detecting device including a plurality of position detecting elements for detecting rotational positions of N- and S-poles of said magnet rotor, and generating rectangular-waveform No.1-phase position detecting signals having the same width by an electric angle of 120 degrees and a phase difference by an electric angle of 360 degrees therebetween, and rectangular-waveform No.2- and No.3-phase position detecting signals having the same width and phase difference as the No.1-phase position detecting signals but successively delayed one another from the No.1-phase position detecting signals by an electric angle of 120 degrees and further rectangular-waveform No.1-phase position detecting signals having the same width and phase difference as the No.1-phase position detecting signals but delayed from said No.1-phase position detecting signals by an electric angle of 180 degrees, and rectangular-waveform No.2- and No.3- phase position detecting signals having the same width and phase difference as the No.1-phase position detecting signals but successively delayed one another from the No.1-phase position detecting signals by an electric angle of 120 degrees;

a switching element connected to both ends of each armature coil;

first diodes inversely connected to a negative voltage terminal of a DC electric power source in parallel with serial joint units each consisting of said switching element and its corresponding armature coil, and second diodes each having one end being inversely connected to a negative voltage terminal of said armature coil;

a first electric circuit for turning on the switching elements connected to both ends of said No.1-, No.2- and No.3-armature coils in response to said No.1-, No.2- and No.3-phase position detecting signals, and further turning on the switching elements connected to both ends of said No.1-, No.2- and No.3-armature coils in response to said No.1-, No.2- and No.3-phase position detecting signals, respectively;

first and second current supply control circuits, for supplying currents to said No.1-, No.2-, No.3- armature coils and No.1-, No.2-, No.3-armature coils through third, fourth, - - - and eighth backflow preventing diodes, respectively connected to the DC electric power source in a forward direction, by turning on said switching elements;

No.1-, No.2-, No.3-, No.1-, No.2- and No.3-capacitors with small capacitances for storing magnetic energies discharged from said No.1-, No.2-, No.3- phase armature coils and said No.1-, No.2-, No.3- phase armature coils through said first and second diodes, each having one end inversely connected to the negative voltage terminal and included in the first and second current supply control circuits, when said No.1-, No.2-, No.3-phase armature coils and said No.1-, No.2-, No.3-phase armature coils are deactivated respectively;

a second electric circuit for supplying electrostatic energies charged in the No.1- and No.1-capacitors to the No.3- and No.3-phase armature coils when the No.3- and No.3-phase armature coils are activated, for supplying electrostatic energies charged in the No.3- and No.3-capacitors to the No.2- and No.2-phase armature coils when the No.2- and No.2-phase armature coils are activated, and further for supplying electrostatic energies charged in the No.2- and No.2-capacitors to the No.1- and No.1-phase armature coils when the No.1- and No.1-phase armature coils are activated; and a means for fixing said position detecting elements on the fixed armature so that an output torque generated by activations of respective armature coils becomes a maximum value.

6. A high-speed plural-phase reluctance type motor including a fixed armature and a magnetic rotor, characterized by comprising:

a plurality of salient poles, each having the same width and disposed on an outer surface of the magnetic rotor, and being mutually spaced at regular intervals of the same angle;

2n pieces (n: a positive integer not less than 3) of magnetic pole protruding from an inner peripheral surface of the fixed armature to face said salient poles through slight gaps, said magnetic poles, disposed at regular intervals and having the same circumferential width of 120 degrees or 180 degrees by electric angle, to be wound with an associated armature coil, each pair of which are symmetrically disposed and have the same phase;

plural-phase armature coils associated with said magnetic poles;

a position detecting device for detecting rotational positions of said salient poles and generating plural-phase position detecting signals;

one switching element connected to each armature coil on the side of a negative terminal of an electric power source;

a first diode connected, in a normal direction, to the armature coil on the side of a positive terminal of the electric power source;

a DC electric power source for supplying electric power to a serial joint unit consisting of said first diode, said armature coil and the switching element;

a current supply control circuit for activating plural-phase armature coils to generate an output torque by turning on said switching elements connected to respective armature coils, in response to said plural-phase position detecting signals;

a first electric circuit for discharging magnetic energy stored in said armature coils through second diodes, each connected between the armature coil and the switching element, and storing them in a small-capacitance capacitor when the switching element is turned off at a terminal end of the position detecting signal so that armature current of the armature coil can be decreased steeply; and a second electric circuit for supplying electrostatic energy charged in the small-capacitance capacitor to the armature coil through a semiconductor element to be turned on in response to the position detecting signal when the armature coil is activated in response to the position detecting signal after a predetermined time has elapsed so that the armature current builds up sharply.

7. A high-speed motor in accordance with claim 6, further comprising an inductance coil to be supplied with current by a width predetermined from beginning point of plural-phase position detecting signals, and a third electric circuit for converting magnetic energy stored in said inductance coil into electrostatic energy of said small-capacitance capacitor when said inductance coil is deactivated so that the electrostatic energy is held to a value added with electrostatic energy converted from the magnetic energy stored in the armature coils, thereby compensating copper loss of the armature coils, and iron loss of the magnetic core respectively occurring when the magnetic energy is transferred between the armature coils, as well as sharpening a building-up of the armature current of the armature coil.

8. A high-speed motor in a plural-phase DC motor including a fixed armature and a magnet rotor, characterized by comprising:

a plurality of N- and S-magnetic poles each having the same width and alternately disposed to be N- or S-pole on an outer surface of the magnet rotor;

3n pieces (n: a positive integer not less than 3) of field magnetic pole disposed to face said N- and S-magnetic poles through slight gaps, said field magnetic poles, disposed at regular intervals and having the same circumferential width of 120 degrees–180 degrees by electric angle, to be wound with an electric angle of 120 degrees–180 degrees;

plural-phase armature coils of bifilar winding associated with said magnetic poles;

a position detecting device including a plurality of position detecting elements for detecting rotational positions of said N- and S-magnetic poles, and for generating rectangular-waveform No.1-phase position detecting signals having the same width by an electric angle of 120 degrees and a phase difference by an electric angle of 360 degrees therebetween, and rectangular-waveform No.2- and No.3-phase position detecting signals having the same width and phase difference as the No.1-phase position detecting signals but being successively delayed one another from the No.1-phase position detecting signals by an electric angle of 120 degrees;

one switching element connected, in a normal direction to each armature coil on the side of a negative terminal of an electric power source;

a first diode connected to the armature coil on the side of a positive terminal of the electric power source;

a DC electric power source for supplying electric power to a serial joint unit consisting of said first diode, said armature coil and the switching element;

a current supply control circuit for activating No.1-, No.2- and No.3-phase armature coils to generate an output torque by turning on said switching elements connected to respective armature coils in response to No.1-, No.2- and No.3-phase position detecting signals;

a first electric circuit for discharging magnetic energy stored in said armature coils through second diodes, each connected between the armature coil and the switching element, and storing them in a small-capacitance capacitor when the switching element is turned off at a terminal end of the position detecting signal so that armature current of the armature coil can be decreased steeply; and a second electric circuit for supplying electrostatic energy charged in the small-capacitance capacitor to the armature coil through a semiconductor element to be turned on in response to the position detecting signal when the armature coil is activated in response to the position detecting signal after a predetermined time has elapsed so that the armature current builds up sharply.

9. A high-speed motor in a plural-phase reluctance type stepping motor including a fixed armature and a magnetic rotor, characterized by comprising:

a plurality of salient poles, each having the same width and disposed on an outer surface of the magnetic rotor and mutually spaced at regular intervals of the same pitch;

2n pieces (n: a positive integer not less than 3) of magnetic pole protruding from an inner peripheral surface of the fixed armature to face said salient poles through slight gaps, said magnetic poles, disposed at regular intervals and with the same circumferential width of 120 degrees or 180 degrees by electric angle, to be wound with an associated armature coil, each pair of which are symmetrically disposed and have the same phase;

plural-phase armature coils associated with said magnetic poles;

a pulse oscillator and a pulse distributer for generating plural-phase stepping electric signals consisting of electric signals, having an electric angle width of 180 degrees, and spaced one another by 180 degrees and electric signals offset from said electric signals by a predetermined phase difference;

one switching element connected to each armature coil on the side of a negative terminal of an electric power source;

a first diode connected, in a normal direction, to the armature coil on the side of a negative terminal of the electric power source;

a DC electric power source for supplying electric power to a serial joint unit consisting of said first diode, said armature coil and the switching element;

a current supply control circuit for activating plural-phase armature coils to generate a stepping output torque by turning on said switching elements connected to respective armature coils, in response to said plural-phase stepping electric signals;

a first electric circuit for discharging magnetic energy stored in said armature coils through second diodes, each connected between the armature coil and the switching element, and storing them in a small-capacitance capacitor when the switching element is turned off at a terminal end of the position detecting signal so that armature current of the armature coil can be decreased steeply; and a second electric circuit for supplying electrostatic energy charged in the small-capacitance capacitor to the armature coil through a semiconductor element to be turned on in response to the stepping electric signal when the armature coil is activated in response to a next arriving stepping electric signal so that the armature current can be built up sharply.

10. A high-speed motor in accordance with claim 9, further comprising an inductance coil which is supplied with current by widths predetermined from beginning points of plural-phase stepping electric signals, and a third electric circuit for converting magnetic energy stored in said inductance coil into electrostatic energy of said small-capacitance capacitor when said inductance coil is deactivated, so that the electrostatic energy is held to a value added with electrostatic energy converted from the magnetic energy stored in the armature coils, thereby compensating copper loss of the armature coils and iron loss of the magnetic core respectively occurring when the magnetic energy is transferred between the armature coils, as well as sharpening a building-up of the armature current of the armature coil.

* * * * *